US011470040B2

(12) United States Patent
Snehashis et al.

(10) Patent No.: US 11,470,040 B2
(45) Date of Patent: Oct. 11, 2022

(54) CLOUD INFRASTRUCTURE RESOURCE INFORMATION SCANNING

(71) Applicant: ORACLE INTERNATIONAL CORPORATION, Redwood Shores, CA (US)

(72) Inventors: Soumya Snehashis, San Lorenzo, CA (US); Ghousia Tanveer, Tempe, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/117,322

(22) Filed: Dec. 10, 2020

(65) Prior Publication Data

US 2022/0191168 A1 Jun. 16, 2022

(51) Int. Cl.
*H04L 61/5007* (2022.01)
*H04L 41/22* (2022.01)
*H04L 61/5061* (2022.01)
*H04L 101/668* (2022.01)

(52) U.S. Cl.
CPC .......... *H04L 61/5007* (2022.05); *H04L 41/22* (2013.01); *H04L 61/5061* (2022.05); *H04L 2101/668* (2022.05)

(58) Field of Classification Search
None
See application file for complete search history.

(56) References Cited

U.S. PATENT DOCUMENTS

| | | | | |
|---|---|---|---|---|
| 9,069,774 | B1 * | 6/2015 | Ansari | H04L 41/12 |
| 10,320,750 | B1 * | 6/2019 | Brandwine | H04L 63/1433 |
| 11,032,691 | B2 * | 6/2021 | Owen | H04L 67/56 |
| 2002/0158900 | A1 * | 10/2002 | Hsieh | H04L 41/22 |
| | | | | 715/738 |

(Continued)

OTHER PUBLICATIONS

ORACLE; Oracle Cloud Infrastructure Documentation—VCNs and Subnets; pp. 1-7, downloaded Sep. 25, 2020 from: https://docs.cloud.oracle.com/en-US/iaas/Content/Network/Tasks/managingVCNs.htm#VCNs_and_Subnets; Copyright 2020, Oracle, Redwood Shores, California, USA.

(Continued)

*Primary Examiner* — Younes Naji
(74) *Attorney, Agent, or Firm* — Kraguljac Law Group, LLC

(57) ABSTRACT

Systems, methods, and other embodiments associated with cloud infrastructure resource information scanning are described. In one embodiment, a computer implemented method includes scanning a cloud network computing system tenancy to, for each subdivision of a set of subdivisions of the tenancy, (i) identify an IP address range assigned to the subdivision, and (ii) identify any immediate parent subdivision to which the subdivision belongs; for each subdivision in the set of subdivisions, determining a proportion of the IP address range assigned to the subdivision that is free in the subdivision based on the identified IP address ranges and the identified parent subdivisions for the subdivision; generating a graphical user interface showing the proportion of the IP address range that is free for one or more of the set of subdivisions; and transmitting the graphical user interface for display on a computing device associated with a user.

20 Claims, 9 Drawing Sheets

(56) References Cited

U.S. PATENT DOCUMENTS

2011/0225286 A1* 9/2011 Francis ................ H04L 63/101
709/224
2015/0082301 A1* 3/2015 Garg ....................... H04L 41/12
718/1
2017/0359124 A1* 12/2017 Mattos ................ H04L 61/5007
2021/0064441 A1* 3/2021 Goyal ................... H04L 47/782

OTHER PUBLICATIONS

ORACLE; Oracle Cloud Infrastructure Documentation—Network Resource Configuration for Cluster Creation and Deployment; pp. 1-8, downloaded Sep. 25, 2020 from: https://docs.cloud.oracle.com/en-US/iaas/Content/ContEng/Concepts/contengnetworkconfig.htm#Network_Resource_Configuration_for_Cluster_Creati . . . ; Copyright 2020, Oracle, Redwood Shores, California, USA.

ORACLE; Oracle Cloud Infrastructure Documentation—CIDR Blocks and Container Engine for Kubernetes; pp. 1-2, downloaded Sep. 25, 2020 from: https://docs.cloud.oracle.com/en-us/iaas/Content/ContEng/Concepts/contengcidrblocks.htm#CIDR_Blocks_ and_Container_Engine_for_Kubernetes; Copyright 2020, Oracle, Redwood Shores, California, USA.

ORACLE; Oracle Cloud Infrastructure Documentation—VOverview of Networking; pp. 1-14, downloaded Sep. 25, 2020 from: https://docs.cloud.oracle.com/en-us/iaas/Content/Network/Concepts/overview.htm#Overview_of_Networking; Copyright 2020, Oracle, Redwood Shores, California, USA.

* cited by examiner

CLOUD INFRASTRUCTURE RESOURCE INFORMATION SCANNING

BACKGROUND

A cloud network computing system such as enterprise clouds like Oracle Cloud Infrastructure or Oracle Generation 2 Cloud Infrastructure (OCI) may be built from the ground up to meet the needs of mission critical applications by supporting all legacy workloads while delivering modern cloud development infrastructure and tools. Such a cloud network computing system provides high performance computing in the cloud, data-driven transformation, autonomous data management, and allows movement and improvement of database workloads. These and other advantages to cloud network computing systems drive customer migration to the cloud.

To continue delivering these services with leading technologies, cloud network computing systems are commonly under constant development. The development is at such a large scale that when multiple application development teams share resources for development, it is quite difficult to identify what resources of the cloud network computing system have been consumed and what resources are still available.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
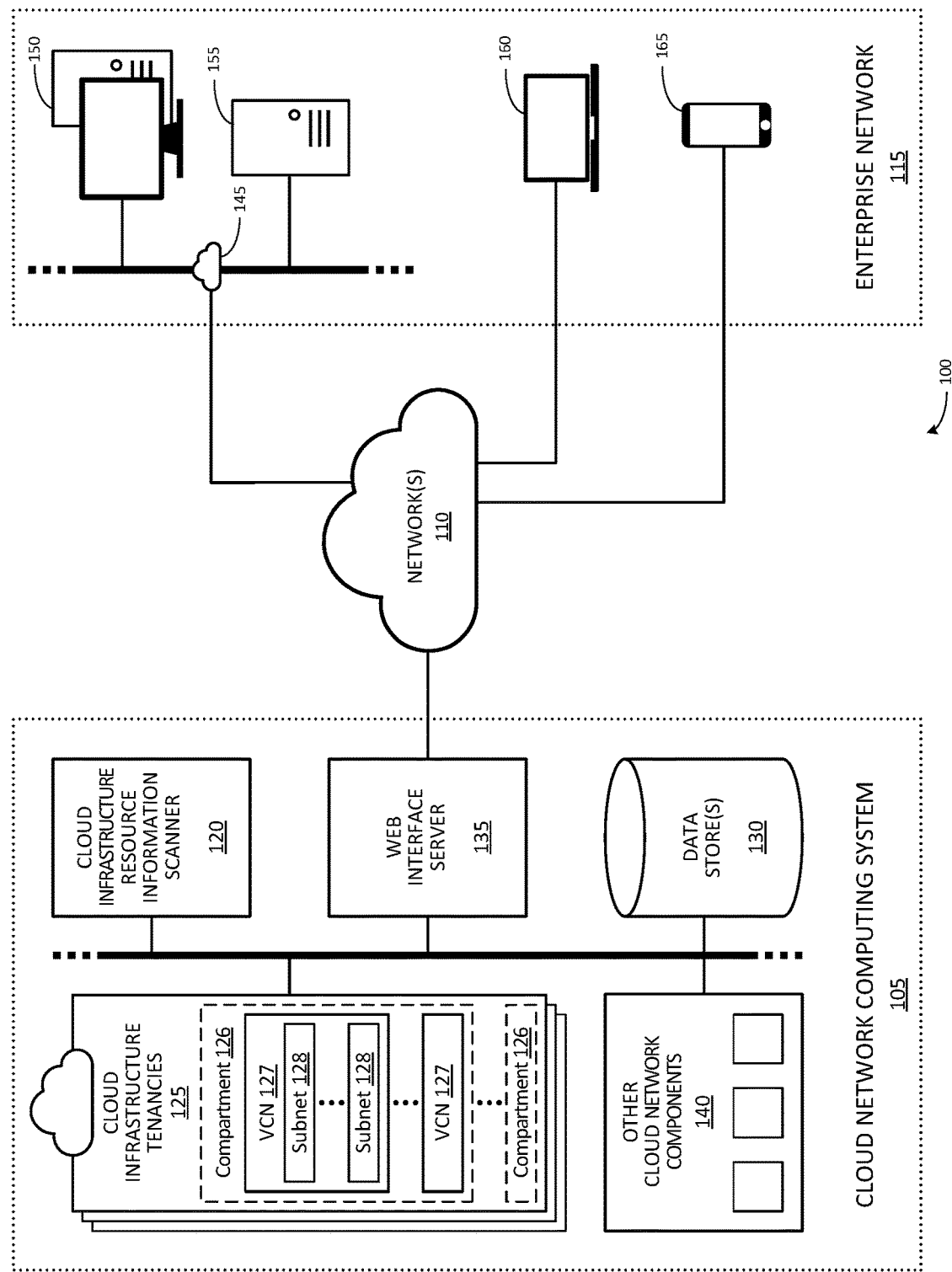
FIG. 1 illustrates one embodiment of a computing system associated with cloud infrastructure resource information scanning.

Systems and methods are described herein that provide cloud infrastructure resource information scanning.

In cloud network computing systems such as OCI, a development phase of an application or addition of new features is an important part of a bigger cycle of delivering business critical requirements to the customer. This development cycle may involve a large number (hundreds, for example) of developers or users sharing resources and components of one tenancy of a cloud network computing system among different teams implementing the same product or different products. In such a use case tenancy resources of the cloud network computing system can be shared within different teams having large number of developers.

In a cloud network computing system, cloud resources such as virtual machines (VMs) need to be addressable by an IP address in order to be used. IP address assignment within a tenancy of the cloud network computing system is managed by the tenant. Application development teams for cloud network computing systems are often responsible for managing and monitoring their resource inventory in a cloud network computing system tenancy—this includes managing assignment of IP addresses to resources. But, development activities in the cloud network computing system tenancy may commonly include multiple application development teams sharing resources for development. This may be at such a large scale that it is quite difficult to identify what resources have been consumed and how much of a resource is still available.

This is especially true when a user wants to find the unused internet protocol (IP) addresses within the subnet(s) of a virtual cloud network (VCN) that can be used for creating node pools or load balancers. Such IP address utilization information was not readily accessible from the cloud network console in an automated fashion.

The cloud network assigns IP addresses when it receives a request through the console to create a new virtual machine in a subnet, and it will either assign the IP address if one is available, or it will deliver an error message indicating that there are no IP addresses available. But the cloud network console is not aware of whether IP addresses remain available to the subnet until after the request to assign an IP to a new virtual machine in the subnet is processed.

This can be problematic and cause significant delays when needing to add more virtual machines to a subnet than remain available for the subnet, and also when attempting to create a new subnet requiring at least a predetermined number of IP addresses. Without the systems and methods described herein, the user is required to perform labor-intensive investigations to determine whether and where sufficient IP addresses are available in subnets or VCNs. These investigations commonly take longer than the time needed to set up a new subnet or virtual machine that will use the identified IP addresses.

Moreover, the time required for the investigations causes the results of the investigation to be based on out-of-date data. A user may complete the process of identifying a suitable range of IP addresses for a new subnet, and attempt to create the new subnet only to find that another user has already assigned some or all of the IP addresses in that range.

One solution to these problems is to give users a quick, informative, and user-friendly way to retrieve the IP details so that resources can be managed efficiently. In one embodiment, the systems and methods cloud infrastructure resource information scanning described herein include a dashboard for display of IP address consumption details (use of IP addresses by compute instances or load balancers) per subnet and per VCN for a given tenancy. This makes it easy for users to visualize the resource utilization and plan accordingly.

The systems and methods for cloud infrastructure resource information scanning described herein enables real-time availability of consolidated IP address utilization information for a tenancy at varying degrees of granularity, including compartment, VCN, and subnet levels of a tenancy. This real time availability of the IP address utilization of the tenancy allows authorized users of the cloud network computing system to identify relevant IP address availability in a timely manner. These improvements to cloud network computing systems were not previously possible for cloud network computing systems that were unequipped with the systems and methods described herein.

The systems and methods for cloud infrastructure resource information scanning described herein enables visualization of resource utilization. The visual presentation of resource utilization may be further categorized by compartments, VCN, and subnets. The visual presentation allows authorized users of the cloud network computing system to see a quick preview of available IP addresses in a subnets or available CIDR blocks to create new subnets from a VCN. These improvements to cloud network computing systems were not previously possible for cloud network computing systems that were unequipped with the systems and methods described herein.

The systems and methods for cloud infrastructure resource information scanning described herein enable cloud network computing systems to automatically discover how many private IP addresses within subnets of a VCN have been consumed in creating instances or load balancers in real time and present this information in real time in a dashboard or console view (single page view). This improvement to cloud network computing systems was not previously possible for cloud network computing systems that were unequipped with the systems and methods described herein.

The systems and methods for cloud infrastructure resource information scanning described herein also enable cloud network computing systems to identify in real time the available (unused or not consumed) IP addresses and IP address ranges that can be utilized in creating instances/load balancers and present this information in real time in a dashboard view. This improvement to cloud network computing systems was not previously possible for cloud network computing systems that were unequipped with the systems and methods described herein.

The systems and methods for cloud infrastructure resource information scanning described herein also enable cloud network computing systems to generate this information at varying levels of granularity in real time—details about the individual VCNs and subnets including the available IP addresses and address ranges, as well as the numbers and ratios of consumed IP addresses to available IP addresses—and present this information in real time in a dashboard view. This improvement to cloud network computing systems was not previously possible for cloud network computing systems that were unequipped with the systems and methods described herein.

The systems and methods for cloud infrastructure resource information scanning described herein also enable cloud network computing systems to present a recommended IP address or IP address range for use in creating instances or load balancers for VCNs or subnets based on the received information. This improvement to cloud network computing systems was not previously possible for cloud network computing systems that were unequipped with the systems and methods described herein.

In one embodiment, a cloud infrastructure resource information scanning dashboard is hosted centrally as a service. In one embodiment, a cloud infrastructure resource information scanning dashboard is hosted as software-as-a-service (SaaS) onto a customer's (family's) tenancy.

No action or function described or claimed herein is performed by the human mind. An interpretation that any action or function can be performed in the human mind is inconsistent and contrary to this disclosure.

—Example Environment—

FIG. 1 illustrates one embodiment of a computing system 100 associated with cloud infrastructure resource information scanning. In one embodiment, system 100 includes a cloud network computing system 105 connected by the Internet 110 (or another suitable communications network or combination of networks) to an enterprise network 115. In one embodiment, cloud network computing system 105 may be an Oracle Cloud Infrastructure or Oracle Generation 2 Cloud Infrastructure (OCI) implementation. In one embodiment, cloud network computing system 105 includes various systems and components such as cloud infrastructure resource information scanner 120, one or more cloud infrastructure tenancies 125, data store(s) 130, web interface server 135, and other cloud network components 140.

The infrastructure for cloud network computing system 105 is hosted in regions and availability domains. A region is a localized geographic area, and an availability domain is a data center—a discrete site including hardware servers, storage systems, switches, routers, firewalls, and other hardware that make up cloud network infrastructure—located within a region. A region is composed of one or more availability domains. The availability domains within the same region are connected to each other by a low latency, high bandwidth network. In one embodiment, the components of cloud network computing system 105 are implemented on one or more hardware computing devices or hosts interconnected by a data network of one or more availability domains. For example, the components of cloud network computing system 105 may be executed by network-connected computing devices of one or more compute hardware shapes, such as standard (or general purpose) shapes, dense input/output (I/O) shapes, graphics processing unit (GPU) shapes, and high-performance computing (HPC) shapes. In one embodiment, the components of cloud network computing system 105 are each implemented by dedicated computing devices. In one embodiment, several or all components of cloud network computing system 105 are implemented by a common (or shared) computing device, even though represented as discrete units in FIG. 1. In one embodiment, components of cloud network computing system 105 may be implemented across multiple computing devices. In one embodiment, cloud network computing system 105 may be hosted by a dedicated third party, for example in an infrastructure-as-a-service (IAAS), platform-as-a-service (PAAS), or software-as-a-service (SAAS) architecture. In one embodiment, the components of cloud network computing system 105 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of cloud network computing system 105 may parse the content of an electronic message or signal received to identify commands or requests that the component can perform, and in response to identifying the command, the component will automatically perform the command or request.

In one embodiment, cloud infrastructure resource information scanner 120 includes one or more components configured for implementing methods (such as method 300), functions, and features described herein associated with cloud infrastructure resource information scanning.

In one embodiment, a cloud infrastructure tenancies 125 is a container for the cloud computing activities and resources associated with one organization, or tenant that isolates those activities and resources from access by and visibility to other organizations using the cloud network computing system 105. Cloud network computing system 105 commonly includes many tenancies 125.

A compartment is a container for grouping together related resources. In one embodiment, each cloud infrastructure tenancy 125 may be subdivided into one or more compartments 126 accessible to only one authorized subset of users associated with (or, authorized to access) the tenancy 125. In one embodiment, a tenancy 125 may have only one compartment (for example, a root compartment), and the authorized set of users may be all users associated with the tenancy 125. The tenancy may also be divided among multiple subsets of users into separate compartments. Users may be authorized to access compartments on a compartment-by-compartment basis, and users will be prevented from accessing compartments for which they are not authorized.

In one embodiment, each compartment 126 may be subdivided into one or more virtual cloud networks (VCNs) 127 created by users authorized to access the compartment. A virtual cloud network (VCN) 127 is a virtual private network that is set up in a region of the of cloud network computing system 105, and may span one or more availability domains in that region. In one embodiment, VCN 127 may closely resemble the topology of a traditional computing network, with communication gateways to allow network communications to enter and exit VCN 127. Such communication gateways may include: (i) dynamic routing gateways (DRGs)—a type of virtual routers that provide a path for private network traffic between the VCN and another network such as an on-premises LAN of a business, like enterprise network 115; (ii) internet gateways—a type of virtual router that provides network traffic of the VCN with direct Internet access; (iii) network address translation (NAT) gateways—a type of virtual router that provides cloud resources such as virtual machines that do not have public IP addresses with access to the Internet without exposing those resources to incoming Internet connections; (iv) service gateways—a type of virtual router that provides a path for private network traffic between the VCN and services offered by the cloud network, such as database storage; (v) local peering gateways (LPGs)—a type of virtual router that enables communication between a first VCN in the cloud network and a second VCN in the cloud network within the same region without the traffic being routed through the Internet or another network outside of the cloud network infrastructure; and (vi) remote peering connections (RPCs)—a type of virtual router that enables private communication between a first VCN in a first region of the cloud network and a second VCN in a second region of the cloud network without the traffic being routed through the Internet or another network outside of the cloud network infrastructure. A VCN may include a route table that includes rules to route traffic from subnets to destinations outside the VCN by way of gateways or specially configured VM instances; a security list of virtual firewall rules governing they types of traffic (by protocol and/or port) allowed in and out of the instances configured within the VCN; and a set of dynamic host configuration protocol (DHCP) options for automatically providing an instance with configuration information (including the IP address assigned to the instance) when the instance starts up.

In one environment, a VCN is hosted within a single cloud network region, and covers a single, contiguous range of classless inter-domain routing (CIDR) IP addresses or CIDR block. This CIDR block assigned to the VCN may be referred to herein as a CIDR superblock. In one embodiment, the VCN size may range from an IP network prefix of /16 (65,534 usable IP addresses per VCN) to an IP network prefix of /30 (2 useable addresses per VCN). In one environment, The IP addresses are Internet Protocol version 4 (IPv4) addresses. In one embodiment the IP addresses are Internet Protocol version 6 (IPv6) addresses.

Each VCN 127 may be subdivided into multiple subnetworks, or subnets 128. Each subnet 128 is made up of a contiguous range of IP addresses or CIDR block that does not overlap with the IP address range of other subnets in the VCN. The CIDR block of a subnet 128 is a discrete subset of the VCN CIDR superblock A subnet 128 may be designated to exist within only one availability domain (an AD-specific subnet) or across all availability domains of a region (a regional subnet). Both AD-specific and regional subnets may coexist within the same region. A subnet 128 includes virtual network interface cards (VNICs) which may be attached to virtual machine (VM) instances in the subnet 128. Each VNIC is uniquely assigned an IP address from the CIDR block of the subnet 128. When a VM instance is provisioned, a VNIC is attached or assigned to the VM, and that VNIC (and the VNICs unique IP address) is no longer available for assignment, but is currently in use. In one embodiment, a networking service of cloud network computing system 105 that handles communications into and out of subnets 128 reserves the first two IP addresses and the last IP address of each subnet's CIDR block, rendering those IP addresses unavailable for assignment to a VM or other resource.

In one embodiment, other cloud network components 140 include components for operating cloud network computing system 105. For example, other cloud network components 140 may include administration modules for governing the access of tenants and users to cloud network computing system 105.

Enterprise network 115 may be associated with a business. For simplicity and clarity of explanation, enterprise network 115 is represented by an on-site local area network 145 to which one or more personal computers 150, or servers 155 are operably connected, along with one or more remote user computers 160 or mobile devices 165 that are connected to the enterprise network 115 through the Internet 110. Each personal computer 150, remote user computer 160, or mobile device 165 is generally dedicated to a particular end user, such as an employee or contractor associated with the business, although such dedication is not required. The personal computers 150 and remote user computers 160 can be, for example, a desktop computer, laptop computer, tablet computer, or other device having the ability to connect to local area network 145 or Internet 110. Mobile device 165 can be, for example, a smartphone, tablet computer, mobile phone, or other device having the ability to connects to local area network 145 or Internet 110 through wireless networks, such as cellular telephone networks or Wi-Fi. Users of the enterprise network 115 interface with cloud network computing system 105 across the Internet 110 (or another suitable communications network or combination of networks).

In one embodiment, remote computing systems (such as those of enterprise network 115) may access information or applications provided by cloud network computing system 105 through web interface server 135. In one embodiment, the remote computing system may send requests to and receive responses from web interface server 135. In one example, access to the information or applications may be effected through use of a web browser on a personal computer 150, remote user computers 160 or mobile device 165. For example, these computing devices 150, 160, 165 of the enterprise network 115 may request and receive a web-page-based graphical user interface (GUI) (such as GUIs 400, 500, 600, and 700) for reviewing real-time cloud infrastructure resource information for the cloud network computing system 105, and dynamically obtaining available CIDR for creating VCNs and subnets in cloud network computing system 105. In one example, web interface server 135 may present HTML code to personal computer 150, server 155, remote user computers 160 or mobile device 165 for these computing devices to render into a GUI for cloud network computing system 105 (including a GUI for access to cloud infrastructure resource information scanner 120). In another example, communications may be exchanged between web interface server 135 and personal computer 150, server 155, remote user computers 160 or mobile device 165, and may take the form of remote representational state transfer (REST) requests using JavaScript object notation (JSON) as the data interchange format for example, or simple object access protocol (SOAP) requests to and from XML servers. For example, computers 150, 155, 160 of the enterprise network 110 may request information included in the custom columns, or may request information derived at least in part from information included in the custom columns (such as analytics results based at least in part on the custom columns).

In one embodiment, data stores 130 includes one or more databases configured to store and serve a broad range of information relevant to applications operating in cloud network computing system 105. In one embodiment, the database is an Oracle® database. In some example configurations, data store(s) 130 may be implemented using one or more Oracle® Exadata compute shapes, network-attached storage (NAS) devices and/or other dedicated server device.

Each of the components (including sub-components) of cloud network computing system 105 is configured by logic to execute the functions that the component is described as performing. In one embodiment, the components of cloud network computing system 105 may each be implemented as sets of one or more software modules executed by one or more computing devices (such as hosts of the cloud network computing system) specially configured for such execution. In one embodiment, these modules include modules for implementing the features shown and described with reference to FIG. 2.

—Example Architecture—

The cloud network computing system 105 maintains information as to (i) what IP addresses are assigned to which resources, (ii) what VCNs and subnets have been created, and (iii) what regions the VCN extends across in a cloud network database, for example in data store 130, or in various locations throughout cloud infrastructure. The available IP addresses in a VCN and in subnets within a VCN can be derived from this information. However, this data is compartmentalized or siloed in the cloud infrastructure, and is not readily accessible in one place. Accordingly, a cloud infrastructure resource information scanner for retrieving the underlying information and deriving the IP address utilization may be implemented.

Figure 2:
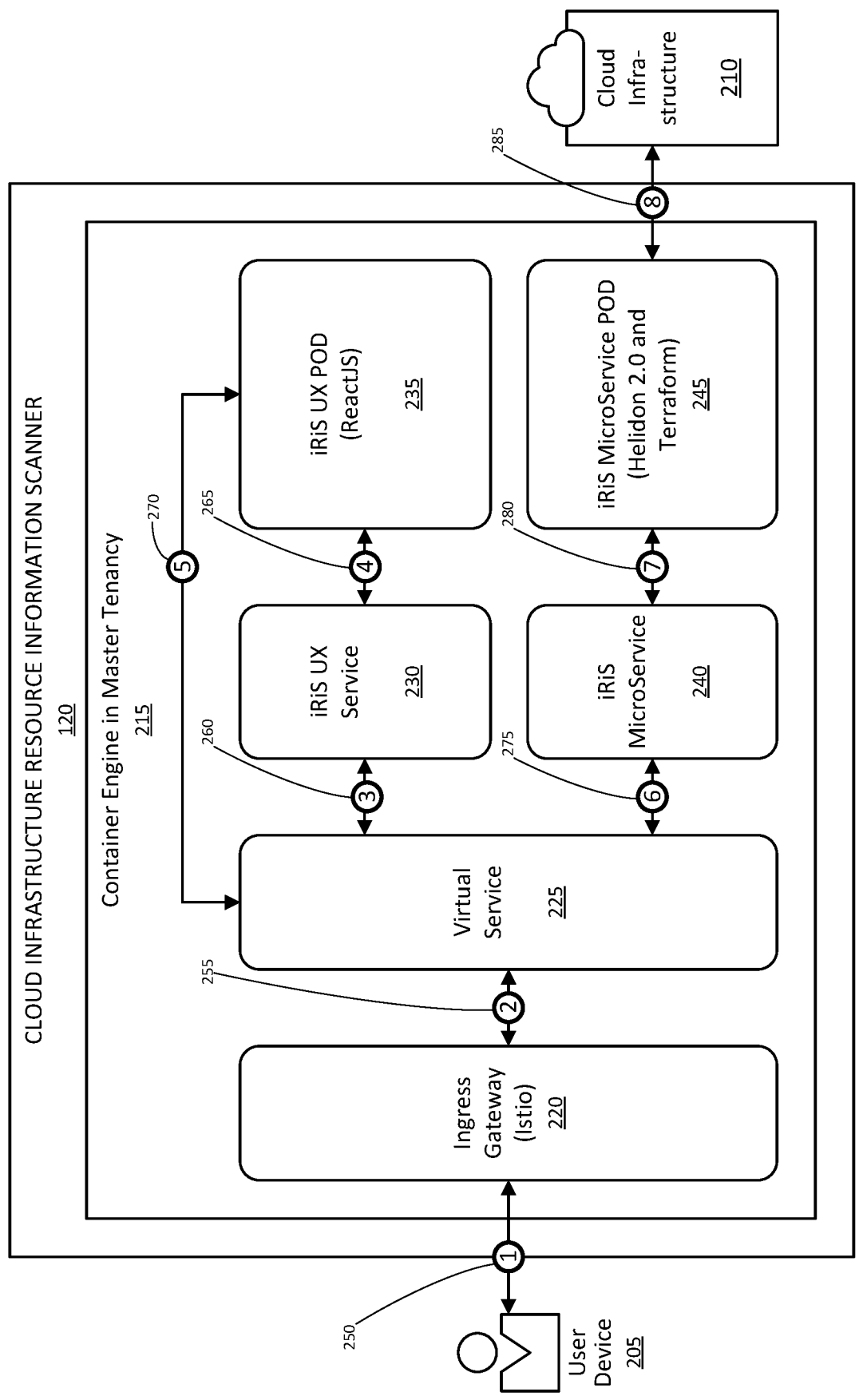
FIG. 2 illustrates one embodiment of a cloud infrastructure resource information scanner.

FIG. 2 illustrates one embodiment of a cloud infrastructure resource information scanner 120. Cloud infrastructure resource information scanner 120 can be accessed by and return information to user device 205 for presentation to a user of the cloud network computing system 105. User device 205 may be, for example, personal computer 150, server 155, remote user computers 160 or mobile device 165. Cloud infrastructure 210 maintains information as to (i) which IP address is assigned to each resource in the cloud, (ii) what VCNs have been created and their configurations, and (iii) what regions a VCN extends across. In one embodiment, cloud infrastructure 210 may maintain this information in a cloud network database, for example in data store 130, of in various siloed locations within a cloud infrastructure tenancy. The available IP addresses in the various subdivisions of a tenancy can be derived from this information. Cloud infrastructure resource information scanner 120 may retrieve information from cloud infrastructure 210.

In one embodiment, cloud infrastructure resource information scanner 120 Includes a container engine 215 in master tenancy. Container engine 215 operates an ingress gateway 220, a virtual service 225, a user interface service 230, a user interface pod 235, a scanner microservice 240, and a scanner microservice pod 245.

In one embodiment, container engine 215 is a container orchestration service. Container engine 215 is configured to manage the life cycles of containerized application software, often referred to as containers, in real-time. A containerized application or container is a software application packaged (or encapsulated) with all its dependencies—everything needed to run the application including code, runtime, configuration files, system tools, system libraries, and settings—that are executable within a container orchestration service 215. In one embodiment, one or more of ingress gateway 220, virtual service 225, user interface service 230, user interface pod 235, scanner microservice 240, and scanner microservice pod 245 is a containerized application or pod of multiple containerized applications. In one embodiment, images of containerized applications are stored in an infrastructure registry of the cloud network computing system, such as in Oracle cloud infrastructure registry (OCIR). In one embodiment, container engine 215 provides a runtime engine for simultaneous execution of one or more containers. In one embodiment, container engine 215 is configured to automatically: provision and deploy containers; provide load balancing across containers; scale-up and remove containers in response to application load; monitor the health of containers (and automatically replace failed containers); and perform other container life cycle management functions. Container engine 215 thus serves to automatically manage, scale, and maintain containerized applications. In one embodiment, container engine 215 may be Oracle container engine for Kubernetes (OKE). In one embodiment, container engine 215 is operating within a compartment of the tenant's tenancy. The compartment contains network resources (such as a VCN, subnets, Internet gateway, route table, and security lists) used to operate container engine 215 and container clusters. In one embodiment, this may be a root compartment of the tenancy. Container engine 215 may create, deploy, and operate container clusters. In one embodiment, container engine 215 can automatically create and configure the network resources to operate a container cluster. In one embodiment, the containerized applications ingress gateway 220, virtual service 225, user interface service 230, user interface pod 235, scanner microservice 240, and scanner microservice pod 245 are clusters of one or more Docker containers configured in Docker's standardized image format for containers.

In one embodiment, ingress gateway 220 is a load balancer configured to operate at the edge of the service mesh operated in container engine 215 that receives incoming hypertext transfer protocol/transmission control protocol (HTTP/TCP) connections. Ingress gateway 220 provides a defined point of entry into the service mesh for traffic from outside of the service mesh. In one embodiment, the service mesh is an Istio service mesh, and the ingress gateway is an Istio ingress gateway. In one embodiment, ingress gateway 220 is also an egress gateway providing a defined point of exit from the service mesh for traffic leaving the service mesh. In one embodiment, ingress gateway 220 defines a front-end URL that may be accessed through a VPN, such as Oracle VPN. For example, the front-front end URL may be http://100.96.188.151:31002/. Port 31002 is an unassigned port number and may be used for cloud infrastructure resource information scanning service traffic. Ingress gateway 220 is configured to redirect access through the front-end URL to virtual service 225. Thus, ingress gateway 220 is a point of contact where authorized users in the public and users in the internal domain can interact with cloud infrastructure resource information scanner 120. In one embodiment, ingress gateway 220 is a containerized application image executed independently in container engine 215.

In one embodiment, virtual service 225 is an overlay over two subservices—user interface service 230 and scanner microservice 240. For example, virtual service 225 defines a set of traffic routing rules to apply to network traffic received at ingress gateway 220. The matching rules define criteria that direct the traffic to the subservices. Virtual service 225 is configured to direct traffic to user interface service 230 if the traffic matches criteria that indicates the traffic to be regarding user interface interactions. Virtual service 225 is configured to direct traffic to scanner microservice 240 if the traffic matches criteria that indicates the traffic to be regarding operation of the scanner. In one embodiment, virtual service 225 is a containerized application image executed independently in container engine 215.

In one embodiment, user interface service 230 performs the front-end, user-facing functions of cloud infrastructure resource information scanner 120. In one embodiment, user interface service 230 is a web server that generates and presents a user interface of the cloud infrastructure resource information scanner 120 to user device 205. For example, the user interface service 230 may be an Nginx web server. In one embodiment, user interface service 230 is configured to generate and serve dynamic HTTP web pages that make up a GUI of the cloud infrastructure resource information scanner 120, for example as shown and described with respect to FIGS. 4-7. In one embodiment, user interface service 230 is a containerized application image executed independently in container engine 215.

In general, a pod, such as user interface pod 235 or scanner microservice pod 245, is a collection of one or more containers providing related services. In one embodiment, user interface pod 235 is a collection of one or more containers providing services (or tools) used by user interface service 230 to generate a user interface for cloud infrastructure resource information scanner 120. In one embodiment, user interface pod 235 includes a code library for building user interfaces, such as a ReactJS JavaScript library. The code library includes functions that enable the display of dynamic charts and graphs that are data-driven. In one embodiment, functions and features of user interface pod 235 may be implemented as containerized application images executed independently in container engine 215.

In one embodiment, scanner microservice 240 performs the back-end, cloud-infrastructure-facing functions of cloud infrastructure resource information scanner 120. In one embodiment, scanner microservice 240 is a containerized application image executed independently in container engine 215.

In one embodiment, scanner microservice pod 245 is a collection of one or more containers providing services (or tools) used by scanner microservice 240 to generate IP address availability information for cloud infrastructure resource information scanner 120. For example, scanner microservice pod 245 is configured (i) to make calls to a tenancy to fetch IP address—resource assignments in the tenancy, a listing of VCNs and subnets in the tenancy, and regions included in each VCN; (ii) to perform the business logic to derive the IP address availability information from the fetched information, and (iii) to return the IP address availability information. In one embodiment, functions and features of scanner microservice pod 245 may be implemented as containerized application images executed independently in container engine 215.

In one embodiment, the scanner microservice pod 245 includes a microservices framework (or microservice architecture) with code libraries for creating microservices, such as Helidon 2.0, as well as one or more microservice applications for deriving IP address availability from retrieved information written using the microservices framework. The microservice applications include the business logic for deriving or generating IP address availability information from specific data available from cloud infrastructure 210. The business logic for deriving IP address availability information may include logic to: (i) identify all IP addresses in a CIDR block assigned to each compartment, VCN, or subnet in a tenancy, and the total number of addresses in each CIDR block; (ii) identify all IP addresses assigned to a resource (such as a VM); (iii) identify all IP addresses reserved by a networking service of cloud network computing system 105; (iv) match IP addresses assigned to a resource with IP addresses in the blocks assigned to the compartments, VCNs, and subnets in the tenancy and label them as in-use; (v) match IP addresses reserved by a networking service with IP addresses in the blocks assigned to the compartments, VCNs, and subnets in the tenancy and label them as reserved; (vi) label all addresses that are not in use or reserved as available; (vii) for each compartment, VCN, and subnet in the tenancy, calculate the ratios of: available IP addresses to total IP addresses in the assigned CIDR block to determine an available ratio, in-use IP addresses to total IP addresses in the assigned CIDR block; and reserved IP addresses to total IP addresses in the assigned CIDR block; (vii) identify the size of contiguous ranges of available IP addresses for each compartment, VCN, and subnet in the tenancy; and (ix) identify all contiguous ranges of IP addresses in a compartment, VCN, or subnet that are equal (or exceed) a selected size. Other business logic may be included. The execution of the business logic is rapid and occurs in real-time.

In one embodiment, the scanner microservice pod 245 includes an infrastructure-as-code (IaC) software tool such as Terraform by HashiCorp configured to fetch information from cloud infrastructure 210 for performing the business logic above for deriving IP address availability information. In one embodiment, the IaC tool is configured to form and execute calls or commands in a native language of cloud infrastructure 210 that retrieve the information needed to derive the IP address availability information. In one embodiment, the IaC tool is configured to retrieve the information needed to derive the IP address availability information of a VCN and its subnets. In one embodiment, the IaC tool is configured to retrieve the IP address availability information of multiple VCNs and their subnets. In one embodiment, the IaC tool is configured to retrieve the IP address availability information of all VCNs and subnets in compartment or a tenancy. The retrieval of information is rapid and occurs in real-time.

In one embodiment, the components of cloud infrastructure resource information scanner 120 interact as follows.

In one embodiment, in interaction 1 250 between user device 205 and ingress gateway 220, at the direction of a user, user device 205 accesses the front-front-end URL of ingress gateway 220. For example, user device 205 may access the front-end URL by being connected to Oracle VPN. Accessing the front-end URL is interpreted by ingress gateway 220 as a request to access cloud infrastructure resource information scanner 120. In one embodiment, the service is accessed through a port assigned to cloud infrastructure resource information scanner 120, such as port 31002. The port is one that is not registered or used by other services. In one embodiment, the front-end URL is http://100.96.188.151:31002/, although other URLs or ports may be assigned.

In one embodiment, in interaction 2 255 between ingress gateway 220 and virtual service 225, ingress gateway 220 redirects the request to virtual service 225. Virtual service 225 interprets the request forwarded from ingress gateway 220 as a request to present a GUI of cloud infrastructure resource information scanner 120.

In one embodiment, in interaction 3 260 between virtual service 225 and user interface service 230, virtual service 225 connects to user interface service 230 and redirects the request to user interface service 230. In one embodiment, user interface service is present—deployed and operating—in the container engine 215 cluster. Virtual service 225 redirects the request forwarded from ingress gateway 220 to user interface service 230 because the request is identified as a request for a GUI.

In one embodiment, in interaction 4 265 between user interface service 230 and user interface pod 235, user interface service 230 calls the user interface pod 235 present—deployed and operating—in a container engine 215 cluster. User interface service 230 thus calls the front-end user interface pod 235. In response to receiving the request, user interface service 230 commences generating a GUI of cloud infrastructure resource information scanner 120. In one embodiment, user interface service 230 requests particular features of the GUI from specific containers in user interface pod 235 that are dedicated to providing the particular features. For example, user interface service 230 may direct a request for a dynamic bar chart to a containerized application for generating dynamic charts. In one embodiment, the containerized applications may include one or more ReactJS components.

In one embodiment, in interaction 5 270 between user interface pod 235 and virtual service 225, the user interface pod 235 (or one or more containers of the user interface pod 235) makes an application programming interface (API) call to virtual service 225 for scanner microservice 240. The API call requests specific information about a tenancy that will be presented in or used to generate a GUI of cloud infrastructure resource information scanner 120. The user interface pod 235 thus calls the virtual service 225 of the back-end scanner microservice.

In one embodiment, in interaction 6 275 between virtual service 225 and scanner microservice 240, the virtual service 225 then sends the API call to scanner microservice 240. Scanner microservice 240 may include an API for the back-end of cloud infrastructure resource information scanner 120. Scanner microservice 240 parses the API call to identify the specific information requested about the tenancy by the API call. Thus, the virtual service 225 redirects the API call to the back-end scanner microservice 240.

In one embodiment, in interaction 7 280 between scanner microservice 240 and scanner microservice pod 245, scanner microservice 240 calls scanner microservice pod 245 present—deployed and operating—in the container engine 215 cluster. In one embodiment, scanner microservice 240 calls one or more containers in scanner microservice pod 245 that implement the business logic to provide the specific information requested by the API call. For example, scanner microservice may direct a request for a number of unallocated IP addresses to a container that implements business logic dedicated to returning that information. In one embodiment, the business logic for providing the requested data and retrieving data necessary to provide the requested data are implemented using Helidon code and Terraform code. Thus, scanner microservice 240 calls scanner microservice pod 245 which performs business logic to return requested data.

In one embodiment, in interaction 8 285 between scanner microservice pod 245 and cloud infrastructure 210, scanner microservice pod 245 executes code scripts (such as Terraform scripts) to fetch data necessary to provide the requested data about the tenancy from cloud infrastructure 210. Cloud infrastructure 210 then returns the fetched data to scanner microservice pod 245. In response to receiving the fetched data from cloud infrastructure 210, scanner microservice pod executes code scripts (such as Helidon scripts) to apply business logic to the fetched data to generate or derive the requested data about the tenancy from the fetched data. Thus, scanner microservice pod 245 makes the call to the configured OCI tenancy to fetch the data needed to produce the requested IP address allocation data.

The requested data is then sent by scanner microservice pod 245 back though scanner microservice 240 and virtual service 225 to user interface pod 235. At user interface pod 235, the requested data is used to generate displays of the requested IP address allocation information in the GUI of cloud infrastructure resource information scanner 120. In one embodiment, the GUI is web page. The generated GUI including the displays of the IP address allocation information are returned through the user interface service 230 to the virtual service 225. Virtual service 225 determines that the completed GUI is to be presented to the user and passes the GUI through gateway 220 to user device 205 for presentation and display on user device 205 to the user. The data presented in the GUI may be updated or changed in response to user interaction with the GUI.

In one embodiment, these operations of cloud infrastructure resource information scanner 120 occur in real-time to provide a live or up-to-date display of IP address allocation information to the user.

In one implemented embodiment for use with OCI, a partial technology stack of cloud infrastructure resource information scanner 120 is shown in Table 1.

TABLE 1

Technology Stack

| Software | Implementation Area | Partial Summary of Functions |
|---|---|---|
| ReactJS (e.g. version 16.13.1) | Front-End User Interface | Generates user interface page elements |
| Helidon (e.g. version 2.0, available in JDK 11) | Back-End Microservice | Supports microservices for implementing business logic of scanner |
| Terraform (e.g. version 0.12.20) | Back-End Microservice | Fetches data from the tenancy in which the scanner is installed |
| Docker (e.g. version 19.03.8) | Infrastructure | Creates docker images for front-end and back-end microservices. |
| Oracle Kubernetes Engine (e.g. version 1.15.7) | Infrastructure | Runs and manages docker image deployments |
| Oracle Cloud Infrastructure Registry | Infrastructure | Stores the software docker images |

In one embodiment, tenants may deploy the docker images for the front-end user interface and back-end scanner microservice into a container engine (for example, Kubernetes) cluster of their tenancy, with appropriate configurations values, and the software will start automatically tracking and reporting the IP address resources consumed by the network.

—Example Method—

In one embodiment, each step of computer-implemented methods described herein may be performed by a processor (such as processor 810 as shown and described with reference to FIG. 8) of one or more computing devices (i) accessing memory (such as memory 815 and/or other computing device components shown and described with reference to FIG. 8) and (ii) configured with logic to cause the system to execute the step of the method (such as cloud infrastructure resource information scanning logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 3:
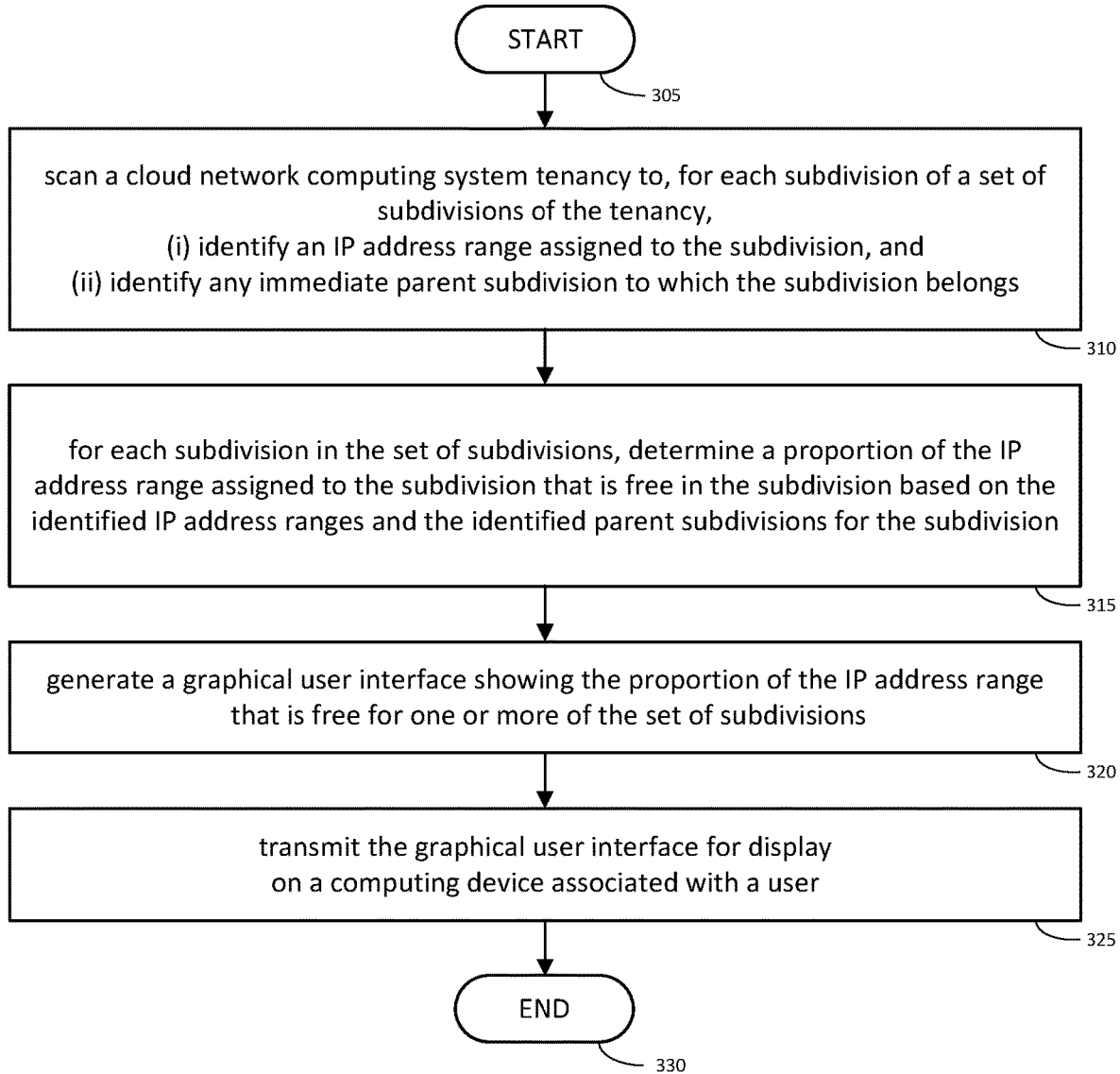
FIG. 3 illustrates one embodiment of a method associated with cloud infrastructure resource information scanning.

FIG. 3 illustrates one embodiment of a method 300 associated with cloud infrastructure resource information scanning. In one embodiment, the steps of method 300 are performed by cloud infrastructure resource information scanner 120 (as shown and described with reference to FIG. 1). In one embodiment, cloud infrastructure resource information scanner 120 is a special purpose computing device (such as computing device 805) configured with cloud infrastructure resource information scanning logic 830. In one embodiment, cloud infrastructure resource information scanner 120 is a module of a special purpose computing device configured with logic 1030. In one embodiment, cloud infrastructure resource information scanner 120 is implemented as a container cluster executed by a container engine (for example as shown and described with reference to FIG. 2). In one embodiment, real time display of IP address utilization and availability information at all levels of a tenancy is enabled by the steps of method 300, where such real time IP address utilization and availability information was not previously possible to be performed by computing devices.

The method 300 may be initiated automatically based on various triggers, such as in response to receiving a signal over a network or parsing stored data indicating that (i) a user (or administrator) of cloud network computing system 105 has initiated method 300, (ii) that that method 300 is scheduled to be initiated at defined times or time intervals, (iii) that a user (or administrator) of cloud network computing system 105 has accessed a front-end URL of a system that operates in accordance with method 300, or (iv) a user (or administrator) of cloud network computing system 105 has selected an option in a front-end GUI for presenting information in accordance with method 300. The method 300 initiates at START block 305 in response to parsing a signal received or stored data retrieved and determining that the signal or stored data indicates that the method 300 should begin. Processing continues to process block 310.

At process block 310, the processor scans a cloud network computing system tenancy to, for each subdivision of a set of subdivisions of the tenancy, (i) identify an IP address range assigned to the subdivision, and (ii) identify any immediate parent subdivision to which the subdivision belongs, as shown and described herein.

In one embodiment the subdivisions of the tenancy include compartments, virtual cloud networks, subnets, and virtual compute resources. As shown and described herein, compartments are a parent subdivision (of the tenancy) including one or more virtual cloud networks, virtual cloud networks are a parent subdivision (of the compartments of the tenancy) to one or more subnets, and subnets are a parent subdivision (of the VCNs of the compartments of the tenancy) to one or more virtual compute resources (such as a worker node, load balancer, or other virtual machine). While the IP address ranges assigned to compartments, VCNs, and subnets are CIDR blocks including multiple contiguous IP addresses, the IP address range assigned to a virtual compute resource is a single IP address specific to the virtual compute resource.

In one embodiment, the processor scans the cloud infrastructure 210 to locate and fetch data from the tenancy used to derive the IP address utilization and availability information as shown and described with reference to the scanner microservice 240 and scanner microservice pod 245. The processor retrieves located information about the compartments, virtual cloud networks, subnets, and virtual compute resources of the tenancy. The information includes the relationship between the tenancy and the tenancy's set of compartments, the relationship between each compartment and the compartment's set of VCNs, the relationship between each VCN and the VCN's set of subnets, and the relationship between each subnet and the subnet's virtual compute resources. For example, the relationship is generally one of including or belonging to between a higher-order grouping and a lower order grouping. The information includes the IP address ranges or CIDR blocks of each of the compartments, VCNs, and subnets, as well as the specific IP addresses allocated to virtual compute resources in the tenancy, or the information needed to derive these values. Additional information describing these subdivisions (including virtual compute resources) may also be retrieved. In one embodiment, the processor retrieves for each virtual compute resource an associated compartment, VCN, and subnet that the virtual compute resource operates within, an IP name for the virtual compute resource, and a specific IP address assigned to the virtual compute resource. In one embodiment, the processor retrieves the IP address range or CIDR block allocated for each compartment, VCN, and subnet in the tenancy. The processor stores the retrieved or derived information, for example, in data store 130, for further use and processing.

Once the processor has thus completed scanning a cloud network computing system tenancy to, for each subdivision of a set of subdivisions of the tenancy, (i) identify an IP address range assigned to the subdivision, and (ii) identify any immediate parent subdivision to which the subdivision belongs, processing at process block 310 completes, and processing continues to process block 315.

At process block 315, for each subdivision in the set of subdivisions, the processor determines a proportion of the IP address range assigned to the subdivision that is free in the subdivision based on the identified IP address ranges and the identified parent subdivisions for the subdivision, as shown and described herein.

In one embodiment, the processor loads the IP address range for each compartment, VCN, and subnet; as well as the associated compartment, VCN, subnet, and assigned IP address of each virtual compute resource from storage. In one embodiment, for each compartment, the processor compares the IP address range of the compartment (the compartment's CIDR block) with the IP address ranges allocated to each VCN located in the compartment to determine which IP address ranges in the compartment's CIDR block are allocated to VCNs, and which IP address ranges in the compartment's CIDR block are not allocated to VCNs. At the compartment level, a proportion of the IP address range assigned to the compartment subdivision that is free in the compartment subdivision is the number of non-allocated (to VCNs) IP addresses in the compartment's CIDR block divided by the total number of IP addresses in the compartment's CIDR block. At the compartment level, a proportion of the IP address range assigned to the compartment subdivision that is used in the compartment subdivision is the number of allocated (to VCNs) IP addresses in the compartment's CIDR block divided by the total number of IP addresses in the compartment's CIDR block.

In one embodiment, for each VCN, the processor compares the IP address range of the VCN (the VCN's CIDR block) with the IP address ranges allocated to each subnet located in the compartment to determine which IP address ranges in the VCN's CIDR block are allocated to subnets, and which IP address ranges in the VCN's CIDR block are not allocated to subnets. At the VCN level, a proportion of the IP address range assigned to the VCN subdivision that is free in the VCN subdivision is the number of non-allocated (to subnets) IP addresses in the VCN's CIDR block divided by the total number of IP addresses in the VCN's CIDR block. At the VCN level, a proportion of the IP address range assigned to the VCN subdivision that is used in the VCN subdivision is the number of allocated (to subnets) IP addresses in the VCN's CIDR block divided by the total number of IP addresses in the VCN's CIDR block.

In one embodiment, for each subnet, the processor compares the IP address range of the subnet (the subnet's CIDR block) with the IP addresses assigned to virtual compute resources located within the subnet to determine which IP addresses in the subnet's CIDR block are assigned to virtual compute resources, and which IP address ranges in the subnet's CIDR block are not assigned to virtual compute resources. At the subnet level, a proportion of the IP address range assigned to the subnet subdivision that is free in the subnet subdivision is the number of non-assigned (to virtual compute resources) and non-reserved (for a networking service) IP addresses in the subnet's CIDR block divided by the total number of IP addresses in the subnet's CIDR block. At the subnet level, a proportion of the IP address range assigned to the VCN subdivision that is used in the VCN subdivision is the number of allocated (to subnets) and reserved (for a networking service) IP addresses in the VCN's CIDR block divided by the total number of IP addresses in the VCN's CIDR block.

The processor stores these proportions for further use and processing.

Once the processor has thus completed, for each subdivision in the set of subdivisions, determining a proportion of the IP address range assigned to the subdivision that is free in the subdivision based on the identified IP address ranges and the identified parent subdivisions for the subdivision, processing at process block 315 completes, and processing continues to process block 320.

At process block 320, the processor generates a graphical user interface showing the proportion of the IP address range that is free for one or more of the set of subdivisions, as shown and described herein. In one embodiment, the graphical user interface is generated by cloud infrastructure resource information scanner 120. In one embodiment, the graphical user interface is generated by user interface service 230 and user interface pod 235, as shown and described with reference to FIG. 2. In one embodiment, the processor generates a graphical user interface as shown and described with reference to FIGS. 5-7 to visually present the proportions. Processing at process block 320 completes, and processing continues to process block 325.

At process block 325, the processor transmits the graphical user interface for display on a computing device associated with a user, as shown and described herein.

In one embodiment, the graphical user interface is received or retrieved from cloud infrastructure resource information scanner 120 by web interface server 135, and transmitted by web interface server 135 to a user device in enterprise network 115 for display. In one embodiment, the graphical user interface as generated in real time by the user interface service 230 and user interface pod 235 is directed to gateway 220 by virtual service 225, and transmitted to a user device 205 in response to a user's request through the front-end URL, as shown and described with respect to FIG. 2. Processing at process block 325 then completes, and processing continues to END block 330, where process 300 ends.

In one embodiment, the method 330 may further include showing, in the graphical user interface, selectable lists of compartments, virtual cloud networks, and subnets within the tenancy, such as drop down menus 435, 440, 445, shown and described with reference to FIG. 4, and similar menus in FIGS. 5, 6A, and 7. The lists are loaded by the processor, the drop down menus are generated, an added to the GUI, for example by user interface service 230 and user interface pod 235, as shown and described with reference to FIG. 2. In one embodiment, in response to a user selection of a compartment using a drop down menu (such as drop down menu 435), the processor generates the graphical user interface as a compartment-level detail page, for example as shown and described with reference to FIG. 5. In one embodiment, in response to a user selection of a virtual cloud network using a drop down menu (such as drop down menu 440), the processor generates the graphical user interface as a virtual-cloud-network-level detail page, for example as shown and described with reference to FIG. 6A. In one embodiment, in response to a user selection of a subnet using a drop down menu (such as drop down menu 440), the processor generates the graphical user interface as a subnet-level detail page, for example as shown and described with reference to FIG. 5.

As described herein, the steps of the methods herein can advantageously be performed in real-time.

—Example Graphical User Interface—

Figure 4:
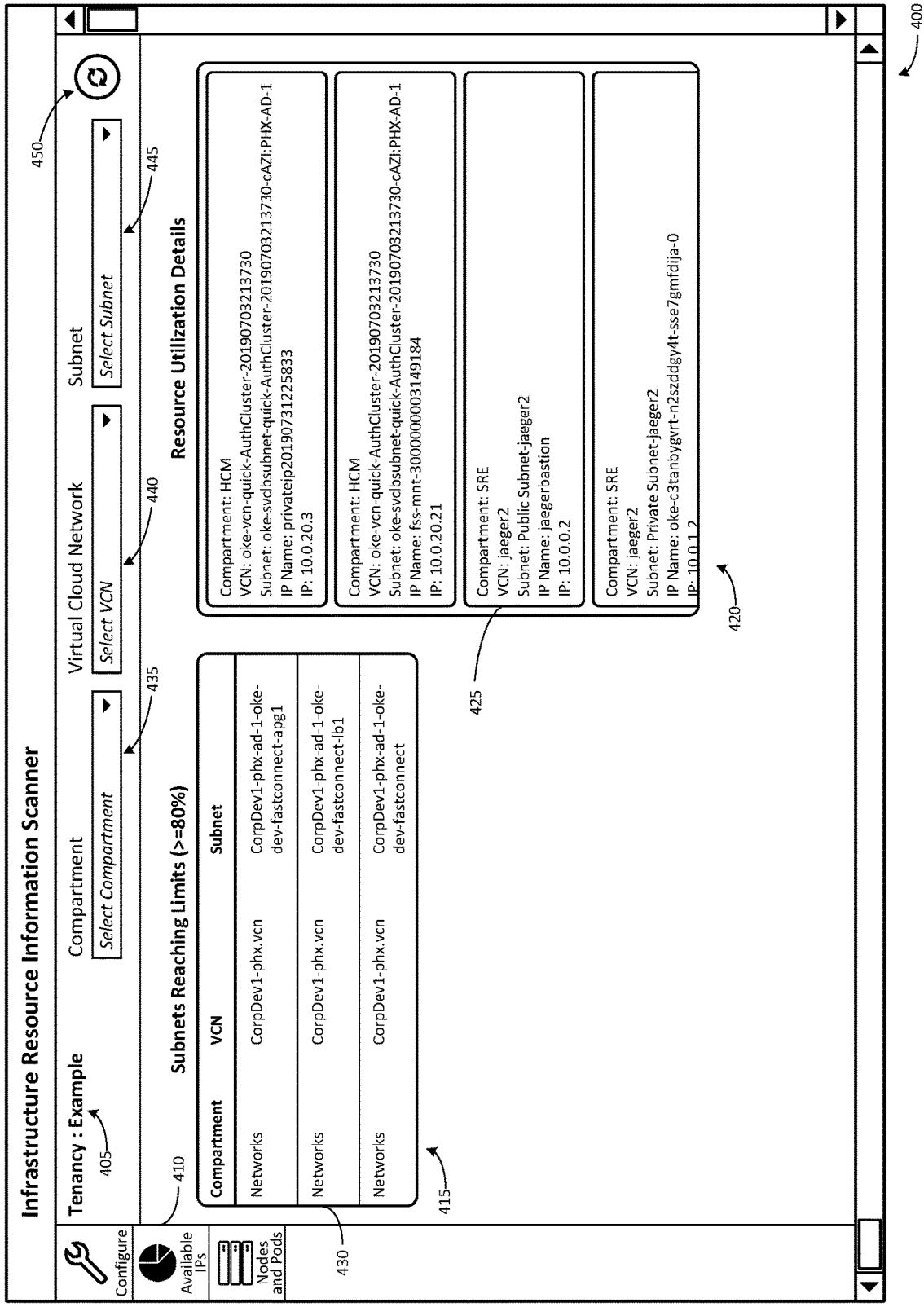
FIG. 4 illustrates one embodiment of a graphical user interface initial page, landing page, or opening page associated with cloud infrastructure resource information scanning.

FIG. 4 illustrates one embodiment of a graphical user interface initial page, landing page, or opening page 400 associated with cloud infrastructure resource information scanning. The graphical user interface is associated with an example tenancy in cloud network computing system 105, as indicated by a tenancy title "EXAMPLE" at reference 405. The opening page 400 can be opened from among other menu options by selecting "available IPs" button 410, in response to this selection, the GUI displays opening page 400. Opening page 400 shows IP address utilization/availability information across the entire tenancy.

In one embodiment, opening page 400 includes a listing of subnets reaching limits 415 within the tenancy and a listing of resource utilization 420 within the tenancy. These listings are automatically populated in real-time with data generated by the scanner back-end. As shown, the listings 415 and 420 are shown as scrollable tables within opening page 400, where rotating a mouse scroll wheel, clicking mouse scroll buttons, using arrow keys, clicking and dragging within the listing, dragging a scroll bar (not shown), or clicking scrolling arrows (not shown) can be used to view additional entries that do not fit within the table view of the listing. Alternatively, the listings 415 and 420 may be presented as paginated tables within opening page 400, where selectable page number, "first", "previous", "next", and "last" links can be used to view additional entries that do not fit within the table view of the listing.

In one embodiment, listing of resource utilization 420 includes an entry (such as example entry 425) for all resources (such as VMs) configured in the tenancy. Each entry shows a name of a compartment (within the tenancy), a name of a VCN (within the compartment), a name of a subnet (within the VCN) that the resource is within, as well as an assigned IP name for the resource and the IP address assigned to the resource, as can be seen in example entry 425 and the other entries. The data or information for populating these entries is retrieved in real-time by the scanner back-end from cloud infrastructure records regarding the tenancy.

In one embodiment, listing of subnets reaching limits 415 includes an entry for each subnet in the tenancy that has used up a high proportion of the IP addresses in the CIDR block allocated to the subnet. In one embodiment, each entry (such as example entry 430) includes a listing of a compartment including the subnet, a VCN including the subnet, and a name of the subnet. In one embodiment, this is determined based on whether a number of IP addresses assigned to VMs (or other resources) in the subnet meets or exceeds a threshold number that indicates the subnet is approaching its limit for assignable (that is, not reserved) IP addresses in the CIDR block allocated to the subnet. In one embodiment, this threshold may be set at a percentage of assignable IP addresses. In one embodiment, this threshold may be set at a percentage of the addresses in the CIDR block allocated to the subnet. In one embodiment, the percentage may be set at 80%. Lower thresholds, for example 70%, may be set if the tenant prefers earlier warning of when a subnet is running out of IP addresses to assign. Higher thresholds may be set, for example 90%, may be set if the tenant does not need a very early warning, such as if the subnets in the tenancy generally have very large CIDR blocks which is are not likely to be rapidly exhausted even after reaching a high threshold. In one embodiment, additional listings of subnets surpassing different thresholds may be presented in opening page 400. In one embodiment, the percentage of IP address utilization for the subnet is calculated from cloud infrastructure records regarding the tenancy and associated with the subnet (e.g. in a data field representing the subnet) by the scanner back-end in real-time. In one embodiment, the determination as to whether the percentage of IP address utilization meets or exceeds the threshold is made and associated with the and associated with the subnet (e.g. in a flag data field representing the subnet) by the scanner back-end in real-time.

In one embodiment, opening page 400 includes drop down menus for viewing IP availability information at different levels of granularity and specific to the various subdivisions of the tenancy. For example, IP availability information can be viewed at the compartment level (as shown and described with reference to FIG. 5), at the virtual cloud network level (as shown and described with reference to FIG. 6A), and at the subnet level (as shown and described with reference to FIG. 7). Select compartment drop down menu 435 is automatically populated with a listing of all compartments in the tenancy. In response to receiving a user input selecting a compartment in the tenancy from select compartment drop down menu 435, the GUI presents a compartment-level detail page (shown and described with reference to FIG. 5) for the selected compartment. Select VCN menu 440 is automatically populated with a listing of all VCNs in the tenancy. In response to receiving a user input selecting a VCN in the tenancy from select VCN drop down menu 440, the GUI presents a VCN-level detail page (shown and described with reference to FIG. 6A) for the selected VCN. Select subnet menu 445 is automatically populated with a listing of all subnets in the tenancy. In response to receiving a user input selecting a subnet in the tenancy from select subnet drop down menu 435, the GUI presents a subnet-level detail page (shown and described with reference to FIG. 7) for the selected subnet. Alternatively, select VCN drop down menu 440 and select subnet menu 445 may be locked and unavailable from opening page, forcing a drill down to the compartment level, VCN level, and subnet level in turn. In one embodiment, the entries in the listings are links to detail pages. For example, in response to selection of example entry 430 in the listing of subnets reaching limits 415, the GUI presents a subnet-level detail page for the 'CorpDev1-phx-ad-1-oke-dev-fastconnect-lb1' subnet. Or, for example, in response to selection of example entry 425 in listing of resource utilization details 420, the GUI presents a subnet-level detail page for the 'Public Subnet-jaeger2' subnet.

In one embodiment, opening page 400 includes a refresh button 450 for reloading IP address availability information presented on the opening page in real-time. The refresh button may be present on other pages for refreshing the data presented on those pages in real-time.

In one embodiment, opening page 400 is a tenancy-level detail page of the GUI. In one embodiment, where the graphical user interface shows a tenancy-level detail page such as opening page 400 and the set of subdivisions includes a set of one or more subnets, method 300 may be extended to include additional steps of: (i) generating a listing of subnets within the tenancy that have assigned a number of IP addresses from an IP address range of the subnet to virtual compute resources that meets or exceeds a threshold that indicates that the subnet is approaching a limit of assignable IP addresses, such as is shown and described with reference to listing of subnets reaching limits 415; (ii) generating a listing of all virtual compute resources included in the tenancy, such as is shown and described with reference to listing of resource utilization 420; and including the listing of subnets and the listing of all virtual compute resources in the tenancy in the tenancy-level detail page, such as is shown in opening page 400.

—Example GUI—Compartment-Level Detail Page—

Figure 5:
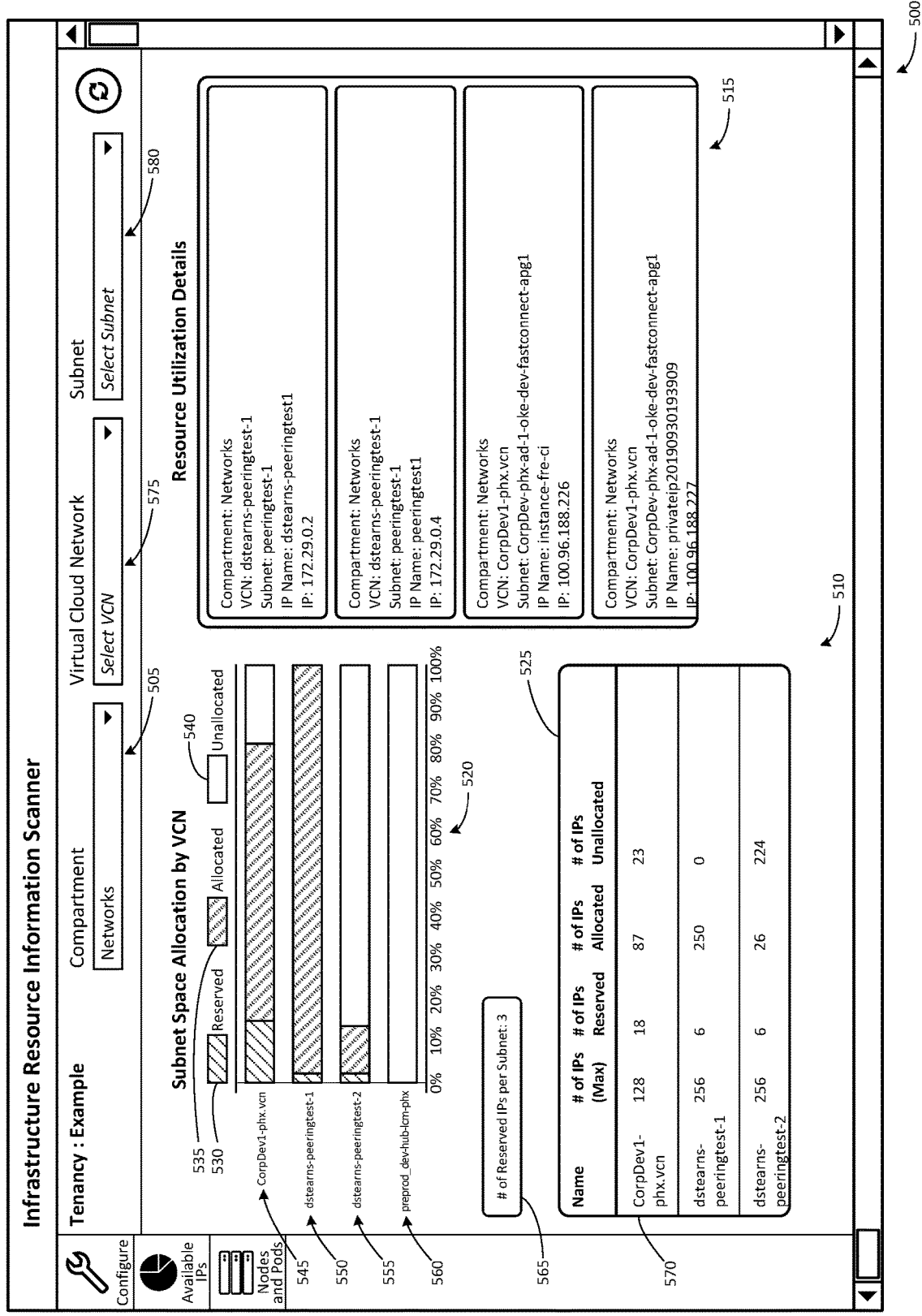
FIG. 5 illustrates one embodiment of a graphical user interface compartment-level detail page associated with cloud infrastructure resource information scanning.

FIG. 5 illustrates one embodiment of a graphical user interface compartment-level detail page 500 associated with cloud infrastructure resource information scanning. The compartment-level detail page 500 is associated with a selected compartment (for example, the "networks" compartment as indicated by the selection in select compartments drop down menu 505). In one embodiment, compartment-level detail page 500 is presented in response to a selection of a particular compartment (for example the "networks" compartment) in a select compartments drop down menu on any page of the GUI. Compartment-level detail page 500 shows IP address utilization/availability information across a selected compartment (e.g., the 'networks' compartment) within the tenancy.

In one embodiment, compartment-level detail page 500 includes a presentation of subnet space allocation by VCN 510 at the left-hand side. At the right-hand side, compartment-level detail page 500 includes a listing of resource utilization 515 filtered to exclude all entries for resources (such as VMs) not within the selected compartment (for example, the 'networks' compartment). Listing of resource utilization 515 therefore includes only entries for resources within the selected compartment. This is visible in the compartment field of each entry, where only entries in the 'networks' compartment appear.

Presentation of subnet space allocation by VCN 510 includes a graphical representation 520 of IP address utilization/availability for each VCN in the selected compartment at top. Presentation of subnet space allocation by VCN 510 includes a numerical breakdown 525 of IP address utilization/availability for each VCN in the selected compartment at bottom. This provides a real-time, at-a-glance dashboard view of IP address utilization/availability by VPN in the selected compartment.

In one embodiment, graphical representation 520 of IP address utilization/availability is a bar chart indicating the proportions of IP addresses in a VCN that are (i) reserved for system use, (ii) allocated or used by the VCN, and (iii) unallocated, free, or available for use by the VCN. The bar charts may be color coded, as represented by different patterns of the bars in the figures. In one embodiment, graphical representation 520 may include a key that shows the colors (or patterns) indicating the status of the IP addresses. Reserved IP addresses may be for example, displayed with an orange color, as indicated by upward diagonal bar fill shown at reserved key 530. Allocated IP addresses may be for example, displayed with a red color, as indicated by downward diagonal bar fill shown at allocated key 535. Unallocated IP addresses may be for example, displayed with a green color, as indicated by clear bar fill shown at unallocated key 540. This graphical representation is driven by real-time, live data retrieved by the scanner back-end from cloud infrastructure records regarding the tenancy.

In one embodiment, graphical representation 520 includes a bar (entry) for each VCN in the compartment. The bar shows the proportions of IP address allocation/utilization for the VCN by segments coded as indicated by the key. The name of the VCN may be placed adjacent to (for example, to the left of) or atop the bar for the VCN. For example, in CorpDev1-phx.vcn bar 545, approximately 15% of the IP addresses in the CIDR block of the CorpDev1-phx.vcn VCN are reserved, approximately 65% of the IP addresses in the CIDR block are allocated, and approximately 20% of the addresses in the CIDR block are unallocated. The CorpDev1-phx.vcn VCN is visually indicated to have limited remaining space for new subnets. In another example, in dstearns-peeringtest-1 bar 550, approximately 3% of the IP addresses in the CIDR block of the dstearns-peeringtest-1 VCN are reserved, and the remainder of the IP addresses in the CIDR block are allocated, leaving no addresses in the CIDR block unallocated. The dstearns-peeringtest-1 VCN is visually indicated to be full. In another example, in dstearns-peeringtest-2 bar 555, approximately 3% of the IP addresses in the CIDR block of the dstearns-peeringtest-2 VCN are reserved, approximately 12% of the IP addresses in the CIDR block are allocated, and approximately 85% of the addresses in the CIDR block are unallocated. The dstearns-peeringtest-2 VCN is visually indicated to have significant remaining space for new subnets. In another example, in preprod_dev-hub-lcm-phx bar 560, none of the IP addresses in the CIDR block of the preprod_dev-hub-lcm-phx VCN are reserved or allocated, showing all IP addresses in the CIDR block to be available. The preprod_dev-hub-lcm-phx VCN is visually indicated to be empty and completely available for creation of new subnets.

In one embodiment, a "number of reserved IPs per subnet" icon 565 is presented to remind the viewer of the GUI of the overhead cost of creating a subnet within a VCN, and explain the proportion of reserved IP addresses in a VCN. In one embodiment, this number may be a data-driven number and may change where the number of reserved IP addresses per subnet varies based on tenancy, compartment, or VCN. In one embodiment, 3 IP addresses are reserved for each subnet: the first two IP addresses and the last IP address in the CIDR block assigned to the subnet are reserved for use by a networking service of the cloud network computing system.

In one embodiment, numerical breakdown 525 includes an entry for each VCN in the compartment. Each entry indicates a maximum number of IP addresses assignable to the VCN (which is the size of the VCN's CIDR block), a number of IP addresses in the VCN's CIDR block that are reserved in the VCN, a number of IP addresses in the VCN's CIDR block that are allocated to subnets in the VCN, and a number of IP addresses in the VCN's CIDR block that are not allocated to subnets. For example, in the CorpDev1- phx.vcn VCN 570, a total of 128 IP addresses are assignable in the VCN, And of those, 18 are reserved, 87 are allocated, and 23 remain available for assignment. Thus, the IP address utilization/availability is broken down by useful or informative numbers for each VCN in the selected compartment.

In one embodiment, where (i) listing of resource utilization 515, (ii) graphical representation 520, or (iii) numerical breakdown 525 has more entries that can be shown in a space allocated to these components 515, 520, 525, these components may individually scroll or be paginated to show additional entries in a manner similar to that described above with reference to FIG. 4.

Select VCN menu 575 is automatically populated with a listing of all VCNs in the compartment, and is filtered to exclude all VCNs in the tenancy that are not in the compartment. Select subnet menu 580 is automatically populated with a listing of all subnets in the compartment, and is filtered to exclude all subnets in the tenancy that are not in the compartment. Select VCN menu 575 and select subnet menu 575 operate in a manner similar to that described with reference to select VCN menu 440 and select subnet menu 445, respectively. In one embodiment, the entries in resource utilization details listing 515, the bars in the bar chart of graphical representation 520, and the entries in numerical breakdown 525 are links to VCN-level detail pages. For example, in response to selection of CorpDev1-phx.vcn bar 545 in graphical representation 520, the GUI presents a subnet-level detail page for the 'CorpDev1-phx.vcn' subnet.

In one embodiment, where the graphical user interface shows a compartment-level detail page showing details of a compartment subdivision of the tenancy (such as compartment-level detail page 500), method 300 may be extended to create the compartment-level detail page. The processor may further generate a listing of virtual cloud networks within the compartment. With that listing, the processor may, for each virtual cloud network, determine (i) a reserved proportion of an IP address range assigned to the virtual cloud network that is reserved for use by a cloud networking service, (ii) an allocated proportion of the IP address range assigned to the virtual cloud network that is allocated to use by virtual compute resources, and (iii) an unallocated proportion of the IP address range assigned to the virtual cloud network that is unallocated and remains available for allocation to virtual compute resources. This information drives the presentation of graphical representation 520, and may be presented in numerical breakdown 525. The processor may generate a graphical representation of the listing of virtual cloud networks within the compartment that visually indicates, for each virtual cloud network, the reserved proportion, the allocated proportion, and the unallocated proportion of the IP address range assigned to the virtual cloud network, such as is shown and described with reference to graphical representation 520. The processor may also filter a listing of virtual compute resources included in the tenancy to include in the listing only those virtual compute resources included in the compartment, such as is shown and described with reference to listing of resource utilization 515. The processor may then include the graphical representation of the listing of virtual cloud networks and the filtered listing of virtual compute resources in the tenancy in the compartment-level detail page, as can be seen in compartment-level detail page 500.

—Example GUI—VCN-Level Detail Page—

Figure 6A:
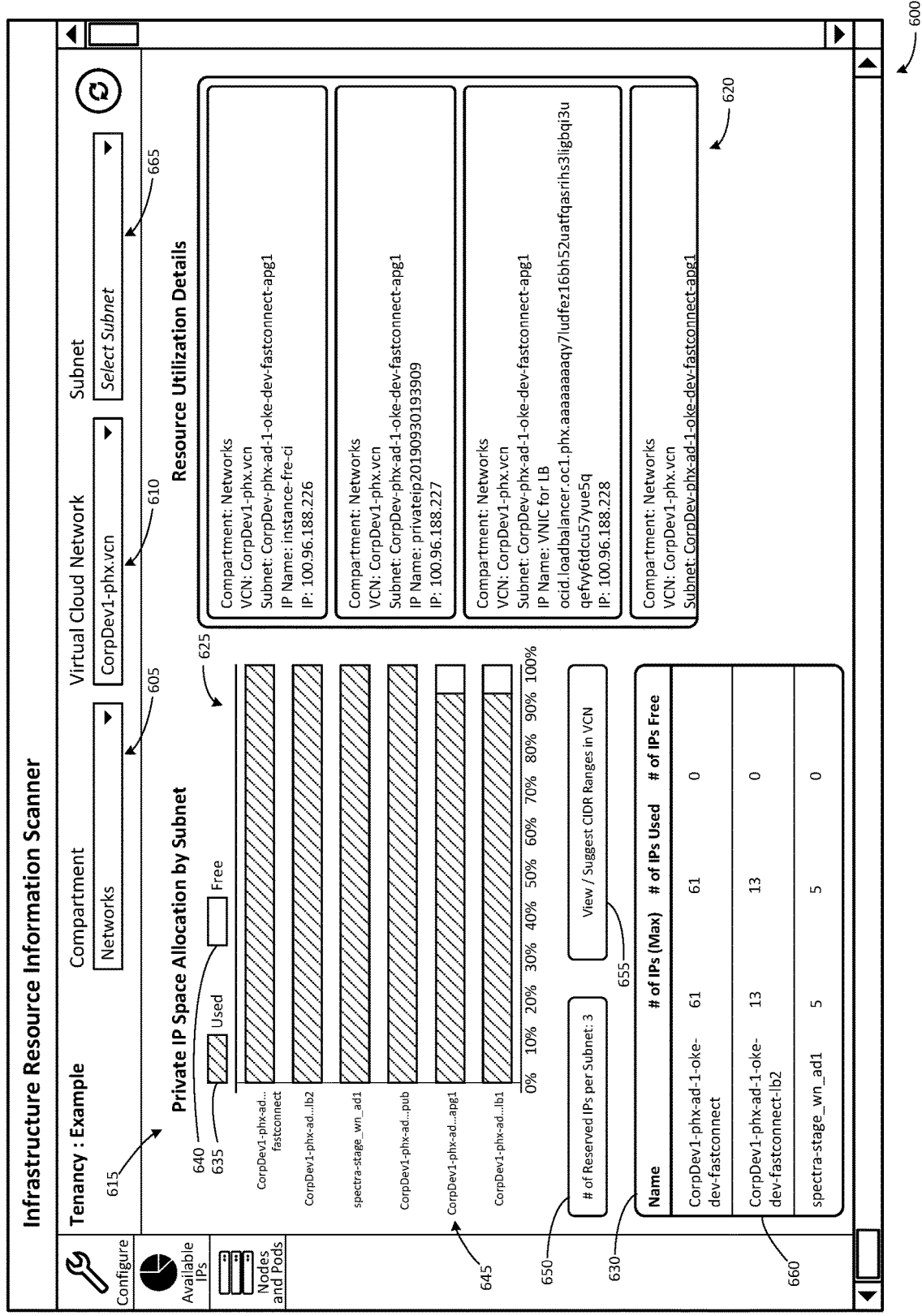
FIG. 6A illustrates one embodiment of a graphical user interface VCN-level detail page associated with cloud infrastructure resource information scanning.

FIG. 6A illustrates one embodiment of a graphical user interface VCN-level detail page 600 associated with cloud infrastructure resource information scanning. The VCN-level detail page 600 is associated with a selected VCN (for example, the "CorpDev1-phx.vcn" VCN in the "networks" compartment as indicated by the selection in select compartments drop down menu 605 and select VCN drop down menu 610). In one embodiment, VCN-level detail page 600 is presented in response to a selection of a particular VCN (for example the "CorpDev1-phx.vcn" VCN) in a select VCN drop down menu on any page of the GUI. VCN-level detail page 600 shows IP address utilization/availability information across a selected VCN (for example, the "CorpDev1-phx.vcn" VCN).

In one embodiment, VCN-level detail page 600 includes a presentation of private IP space allocation by subnet 615 at the left-hand side. At the right-hand side, VCN-level detail page 600 includes a listing of resource utilization 620 filtered to exclude all entries for resources (such as VMs) not within the selected VCN (for example, the "CorpDev1-phx.vcn" VCN). Listing of resource utilization 620 therefore includes only entries for resources within the selected VCN. This is visible in the VCN field of each entry, where only entries in the "CorpDev1-phx.vcn" VCN appear.

Presentation of private IP space allocation by subnet 615 includes a graphical representation 625 of IP address utilization/availability for each subnet in the selected VCN at top. Presentation of private IP space allocation by subnet 615 includes a numerical breakdown 630 of IP address utilization/availability for each subnet in the selected VCN at bottom. This provides a real-time, at-a-glance dashboard view of IP address utilization/availability by subnet in the selected VCN.

In one embodiment, graphical representation 625 of IP address utilization/availability is a bar chart indicating the proportions of IP addresses in a subnet that are (i) allocated (to a VM or other resource) or used by the subnet, and (ii) unallocated, free, or available for use by the subnet. The bar charts may be color coded, as represented by different patterned fill of the bars in the figures. In one embodiment, graphical representation 625 may include a key that shows the colors (or patterns) indicating the status of the IP addresses. Allocated IP addresses may be for example, displayed with a red color, as indicated by upward diagonal bar fill shown at allocated key 635. Unallocated IP addresses may be for example, displayed with a green color, as indicated by clear bar fill shown at unallocated key 640. This graphical representation is driven by real-time, live data retrieved by the scanner back-end from cloud infrastructure records regarding the tenancy.

In one embodiment, graphical representation 625 at the subnet level includes a bar (entry) for each subnet in the VCN, similar to graphical representation 520 at the VCN level. The bar shows the proportions of IP address allocation/utilization for the subnets by segments coded as indicated by the key. The name of the subnet may be placed adjacent to (for example, to the left of) or atop the bar for the subnet. For example, as shown in CorpDev-phx-ad-1-oke-dev-fastconnect-apg1 bar 645, approximately 95% of the IP addresses in the CIDR block of the CorpDev-phx-ad-1-oke-dev-fastconnect-apg1 subnet allocated, and approximately 5% of the addresses in the CIDR block are unallocated. The CorpDev-phx-ad-1-oke-dev-fastconnect-apg1 subnet is visually indicated to have limited remaining space for new subnets.

In one embodiment, a "number of reserved IPs per subnet" icon 650 similar to icon 565 is presented to remind the viewer of the GUI of the overhead cost of creating a subnet within a VCN.

In one embodiment, a "View/Suggest CIDR Ranges in VCN" button 655 is presented. Upon selection, a "View/

Figure 6B:
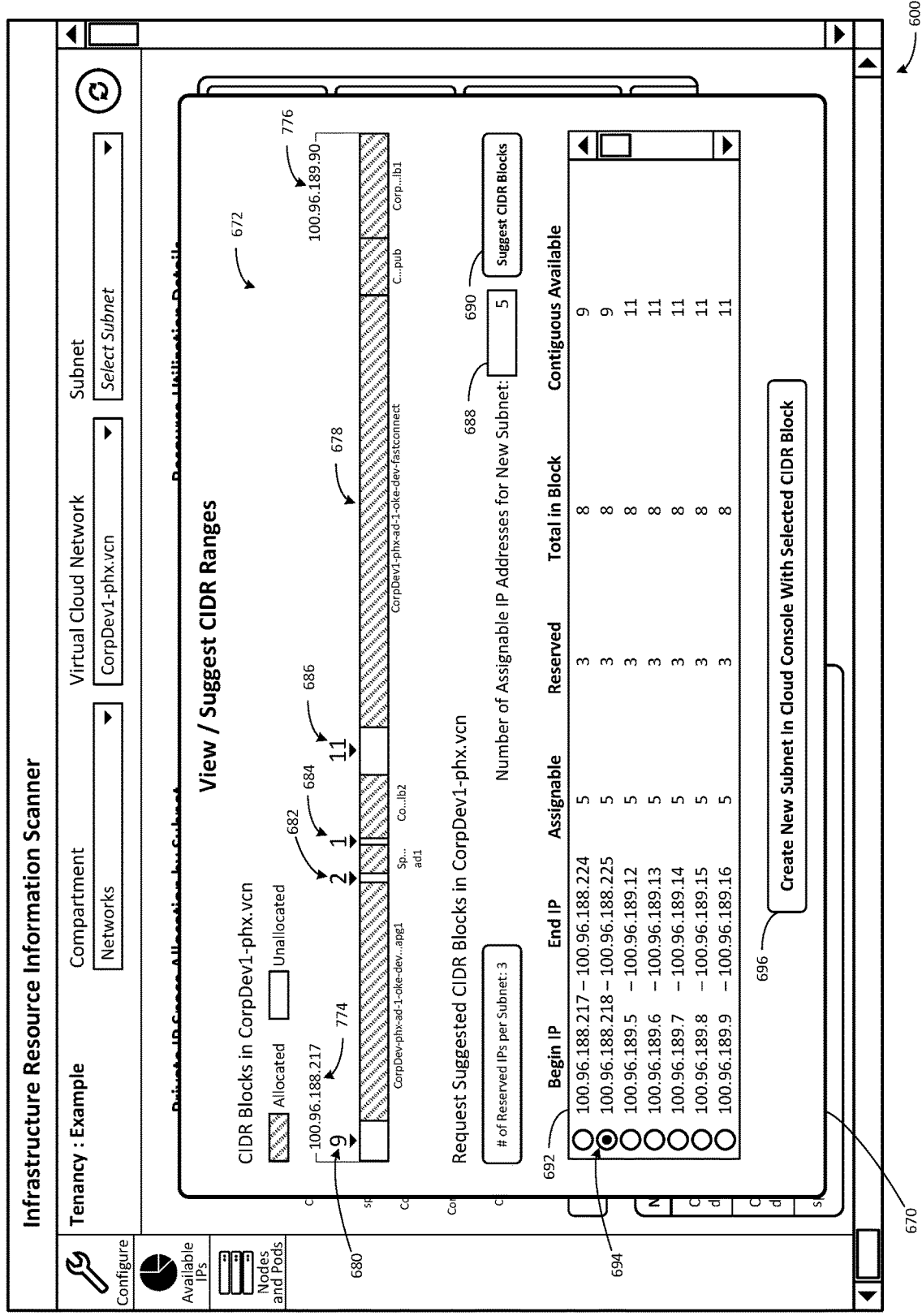
FIG. 6B illustrates one embodiment of a graphical user interface showing a View/Suggest CIDR Ranges menu associated with cloud infrastructure resource information scanning.

Suggest CIDR Ranges" page, such as page 670 as shown and described with reference to FIG. 6B, is presented in the GUI.

In one embodiment, numerical breakdown 630 includes an entry for each subnet in the VCN. Each entry indicates a maximum number of IP addresses assignable to resources (such as VMs) in the subnet (the maximum number is the size of the subnet's CIDR block)), a number of IP addresses in the subnet's CIDR block that are used or allocated to resources in the subnet (including the reserved IP addresses), subnets in the VCN, and a number of IP addresses in the subnet's CIDR block that are free or not allocated to resources. For example, in the CorpDev1-phx-ad-1-oke-dev-fastconnect-lb2 subnet 660, a total of 13 IP addresses are assignable in the subnet, and of those, 13 are used—10 by resources in the subnet and 3 by the cloud networking service—and none remain free for assignment. Thus, the IP address utilization/availability is broken down by useful or informative numbers for each subnet in the selected VCN.

In one embodiment, where (i) listing of resource utilization 620, (ii) graphical representation 625, or (iii) numerical breakdown 630 has more entries that can be shown in a space allocated to these components 620, 625, 630, these components may individually scroll or be paginated to show additional entries in a manner similar to that described above with reference to FIG. 4.

Select subnet menu 665 is automatically populated with a listing of all subnets in the selected VCN, and is filtered to exclude all subnets in the tenancy that are not in the selected VCN. Select subnet menu 665 operates in a manner similar to that described with reference to select subnet menu 445. In one embodiment, the entries in resource utilization details listing 515, the bars in the bar chart of graphical representation 520, and the entries in numerical breakdown 525 are links to subnet-level detail pages. For example, in response to selection of CorpDev-phx-ad-1-oke-dev-fastconnect-apg1 bar 645 in graphical representation 630, the GUI presents a subnet-level detail page for the 'CorpDev-phx-ad-1-oke-dev-fastconnect-apg1' subnet.

In one embodiment, where the graphical user interface shows a virtual-cloud-network-level detail page showing details of a virtual cloud network subdivision of the tenancy such as VCN-level detail page 600, method 300 may be extended to create the VCN-level detail page. The processor may further generate a listing of subnets within the virtual cloud network. With that listing, the processor may for each subnet, determine (i) a used proportion of an IP address range assigned to the subnet that has been assigned to specific virtual compute resources within the subnet for use, and (ii) a free proportion of the IP address range assigned to the subnet that has not been assigned to virtual compute resources. This information drives the presentation of graphical representation 625, and may be presented in numerical breakdown 630. The processor may generate a graphical representation of the listing of subnets within the virtual cloud network that visually indicates, for each subnet, the used proportion and the free proportion of the IP address range assigned to the subnet, such as shown and described with reference to graphical representation 625. The processor may also filter a listing of virtual compute resources included in the tenancy to include in the listing only those virtual compute resources included in the virtual cloud network, such as is shown and described with reference to listing of resource utilization 620. The processor may then include the graphical representation of the listing of subnets and the filtered listing of virtual compute resources in the tenancy in the virtual-cloud-network-level detail page, as can be seen in VCN-level detail page 600.

—Example GUI—CIDR Range Suggestion—

FIG. 6B illustrates one embodiment of a graphical user interface showing a View/Suggest CIDR Ranges menu 670 associated with cloud infrastructure resource information scanning. In one embodiment, menu 670 is presented as a pop-up or overlay window atop another page of the GUI, such as atop VCN-level detail page 600. Menu 670 shows free (available) and used (assigned) CIDR ranges within a selected VCN.

In one embodiment, menu 670 is launched from VCN-level detail page 600, for example in response to selection of button 655, and shows free and used CIDR ranges within the selected VCN of the launching VCN-level detail page 600, in this case CorpDev1-phx.vcn. In one embodiment, menu 670 is launched from compartment-level detail page 500 in response to a selection of a displayed VCN. For example, menu 670 may be launched in response to a left-click, right-click, alt-click, or other selection of a displayed VCN bar (such as CorpDev-phx.vcn bar 545) or resource utilization entry. An intermediate menu may be presented in response to the left-click, right-click, alt-click, or other selection to enable the user to select launching menu 670 for the selected VCN from among other options for the selected VCN, such as an option to display the VCN-level detail for the selected VCN. Menu 670 will be presented in response to the user's selections. Other launch points for menu 670 within the GUI are also possible.

In one embodiment, menu 670 includes a graphical representation of IP address utilization/availability for one selected VCN. The allocation is displayed in a color- or pattern-coded bar chart 672. Bar chart 672 may show CIDR blocks of IP addresses allocated to subnets in the VCN with a red color, indicated by downward diagonal bar fill, and CIDR blocks of IP addresses not allocated to subnets with a green color, as indicated by clear bar fill.

In one embodiment, bar chart 672 shows utilization and availability of IP addresses as contiguous IP address ranges within the whole CIDR block for the VCN, rather than as percentages of utilization and availability. The initial or beginning IP address 774 of the CIDR block for the selected VCN is shown at leftmost of bar chart 672, and the final or ending IP address 776 of the CIDR block for the selected VCN is shown at rightmost of bar chart 672. The IP addresses of the CIDR block of the selected VCN ascend from the initial to the final IP address in bar chart 672. CIDR blocks assigned to subnets are shown in bar chart 672 covering the actual IP address ranges of those CIDR blocks, for example as shown at reference 678. CIDR blocks not assigned to subnets are shown in bar chart 672 covering the actual available IP address ranges, as shown at references 680, 682, 684, and 686. In one embodiment, the size of the available contiguous IP address range is displayed, as shown at references 680, 682, 684, and 686. This provides a real-time, at-a-glance dashboard view of IP address block utilization/availability for a selected VPN that allows the user to rapidly determine where (if anywhere) within a VPN a new subnet may fit.

Further, menu 670 may suggest IP address ranges within the VCN for assigning to a new subnet in the VCN based on a requested number of assignable IP addresses for the new subnet. In one embodiment, menu 670 can accept a user input of a number of assignable IP addresses for a new subnet at form field 688. In response to user selection of "suggest CIDR Blocks" button 690, the system generates and presents in list field 692 a list of ranges of available IP addresses within the VCN's CIDR block that are of sufficient size to accommodate the requested number of assignable fields entered at form field 688. In one embodiment, each IP address range in the list, the list shows a beginning IP address of the range, an end IP address of the range, a number of IP addresses assignable to resources in a subnet created from the range, a number of IP addressed reserved in a subnet created from the range, a total number of addresses in a CIDR block for a subnet created from the range, and a total size of a contiguous range of IP addresses in which the listed range occurs. In one embodiment, all IP address ranges of at least sufficient size are included in list field 692. In one embodiment, only a first few available IP address ranges of sufficient size are presented in list field 692. In one embodiment, only a subset of available IP address ranges of sufficient size are presented in list field 692. In one embodiment, only IP address ranges adjacent to the CIDR blocks of existing subnets in the VCN are presented in list field 692. If the number of IP address ranges of sufficient size is greater than the number of IP address ranges that can be shown in list field 692, list field 692 may be scrollable or paginated. In one embodiment, only one IP address range of sufficient size is presented.

In one embodiment, the user may review the list of suggested IP address ranges for a real-time, at-a-glance dashboard view of IP address range utilization/availability within a VPN for informational purposes. In one embodiment, the user may select on of the suggested IP address ranges, for example by selecting a radio button 694, and automatically launch a process to create a new subnet using the selected range in response to a user selection of "Create New Subnet In Cloud Console With Selected CIDR Block" button 696. In one embodiment, in response to user selection of button 696, a console of the cloud network computing system 105 (for example, the OCI console) is accessed, and a create new subnet dialogue of the consoled is launched with the selected IP address range automatically pre-populated as the CIDR block of the new subnet in the dialogue. In one embodiment, the user need not expressly select one of the suggested CIDR blocks, and in response to selecting button 696, the system will automatically select one of the suggested CIDR blocks (for example, by selecting the first listed CIDR block. In one embodiment, the VCN is automatically pre-populated in the create new subnet dialogue. The user may then complete the remaining setup of the new subnet in the console. In one embodiment, the selected IP address range may be presented in the GUI as "used" following selection of button 696, at least temporarily, even though the new subnet is not yet completed in the console. The user may thus complete the creation of a new subnet rapidly, with current, real-time IP address availability information, removing the risk that the selected IP address range/CIDR block will be assigned to other subnets before creation of the new subnet.

In one embodiment, a View/Suggest CIDR ranges menu similar to menu 670 can also be implemented at the compartment level to show the IP address ranges occupied by VCNs within the compartment, and to recommend IP address ranges within the compartment for formation of new VCNs based on a requested size of the VCN. The compartment-level View/Suggest CIDR ranges menu may also automatically launch a console dialog for creating a new VCN with its IP address range automatically pre-populated with a suggested CIDR block.

In one embodiment, where the graphical user interface shows a view of IP address ranges allocated to subnets within the IP address range of a virtual cloud network subdivision of the tenancy (such as in chart 672 in menu 670), method 300 may be extended to create the view of the VCN IP address ranges. The processor may generating a listing of subnets within the virtual cloud network. With that listing, the processor may, for each subnet in the listing, identify a beginning IP address and an end IP address of the IP address range allocated to the subnet. The VCN IP address range, the listing of subnets, and the beginning and end IP addresses of the subnets drive the presentation of chart 672. The processor may generating a graphical representation of the IP address range of the virtual cloud network assigned to subnets within the IP address range of the virtual cloud network that visually indicates IP addresses between the beginning IP address and end IP address, inclusive, of each subnet in the listing to be allocated, and visually indicates other IP addresses to be unallocated (such as chart 672, as shown and described herein). The processor may include the graphical representation of the IP address range of the virtual cloud network assigned to subnets within the IP address range of the virtual cloud network in one or more pages of the graphical user interface, for example by presenting it in menu 670.

In one embodiment, where the graphical user interface presents an interface for suggesting an IP address range for a new subnet within a virtual cloud network subdivision of the tenancy (such as menu 670), method 300 may be extended to create the interface. The processor may generate a listing of subnets within the virtual cloud network. With this listing, the processor may, for each subnet in the listing, identifying a beginning IP address and an end IP address of the IP address range allocated to the subnet. These steps may be shared with the generation of chart 672, as described above. The processor may then identify a set of unallocated IP address ranges within the IP address range of the virtual cloud network that do not overlap with the IP address ranges allocated to subnets. The processor may, for each unallocated IP address range in the set, determine the number of IP addresses within the IP address range (CIDR block). The processor may also determine a number of reserved addresses (reserved for a cloud networking service) for a subnet, for example by retrieving a universal value applicable to all subnets in the tenancy. The processor may accept a user size input that indicates a desired size for a new subnet within the virtual cloud network. These values—the size of contiguous available blocks, the number of reserved addresses, and the user size input—drive the presentation of a list of available IP address ranges suitable for creating a new subnet of the requested size (such as is shown in list field 692). The processor may, in response to the user size input, identify a set of suitable ranges that are of sufficient size to accommodate the new subnet of the desired size within the unallocated IP address ranges based on these values. These values may also be presented in the list of available IP address ranges to add additional information about the listed ranges. From that list, the processor may accept a user selection input that selects one of the suitable ranges (such as indicating an available IP range with radio button 694 and selecting it by selecting button 696). The processor may then, in response to the user selection input, launch a console dialogue to create the new subnet with IP address range values in the dialogue automatically pre-populated with the selected suitable range, as discussed herein.

—Example GUI—Subnet-Level Detail Page—

Figure 7:
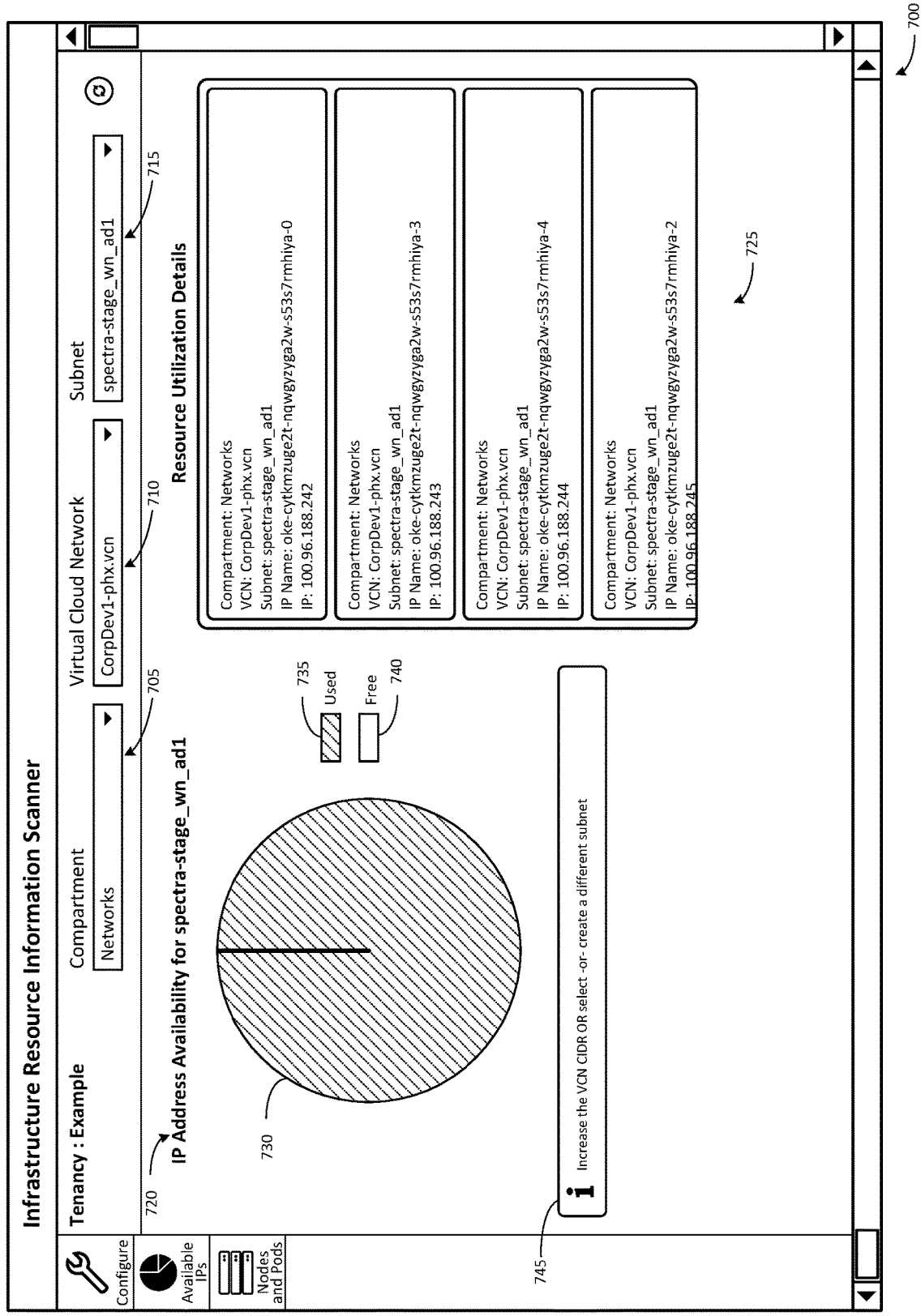
FIG. 7 illustrates one embodiment of a graphical user interface subnet-level detail page associated with cloud infrastructure resource information scanning.

FIG. 7 illustrates one embodiment of a graphical user interface subnet-level detail page 700 associated with cloud infrastructure resource information scanning. The subnet-level detail page 700 is associated with a selected subnet (for example, the "spectra-stage_wn_ad1" subnet in the CorpDev1-phx.vcn of the "networks" compartment as indicated by the selection in select compartments drop down menu 705, select VCN drop down menu 710, and select subnet drop down menu 715). In one embodiment, subnet-level detail page 700 is presented in response to a selection of a particular subnet (for example the "spectra-stage_wn_ad1" subnet) in a select subnet drop down menu on any page of the GUI. Subnet-level detail page 700 shows IP address utilization/availability information within a subnet (for example, the "spectra-stage_wn_ad1" subnet).

In one embodiment, subnet-level detail page 700 includes a presentation of IP address availability for the selected subnet 720 at the left-hand side. At the right-hand side, subnet-level detail page 700 includes a listing of resource utilization 725 filtered to exclude all entries for resources (such as VMs) not within the selected subnet (for example, the "spectra-stage_wn_ad1" subnet). Listing of resource utilization 725 therefore includes only entries for resources within the selected subnet. This is visible in the subnet field of each entry, where only entries in the "spectra-stage_wn_ad1" subnet appear.

Presentation of IP address availability for the selected subnet 720 includes a graphical representation 730 of IP address utilization/availability for the selected subnet. This provides a real-time, at-a-glance dashboard view of IP address utilization/availability by subnet in the selected VCN.

In one embodiment, graphical representation 730 is a pie chart indicating the proportions of IP addresses in a subnet (for example, the "spectra-stage_wn_ad1" subnet) that are (i) allocated (to a VM or other resource) or used by the subnet, and (ii) unallocated, free, or available for use by the subnet. Graphical representation (pie chart) 730 may be color coded, as represented by different patterned fill. In one embodiment, graphical representation (pie chart) 730 may have a key that shows the colors (or patterns) indicating the status of the IP addresses. Allocated IP addresses may be for example, displayed with a red color, as indicated by upward diagonal fill shown at "used" key 735. Unallocated IP addresses may be for example, displayed with a green color, as indicated by clear fill shown at "free" key 740. This graphical representation is driven by real-time, live data retrieved by the scanner back-end from cloud infrastructure records regarding the tenancy. As is visible from graphical representation (pie chart) 730, all IP addresses of the CIDR block for "spectra-stage_wn_ad1" subnet are used, and none are free. Thus, the "spectra-stage_wn_ad1" subnet is visually indicated to be full.

In one embodiment, in situations where a subnet is full or nearly full, the GUI may present an information box 745 indicating how additional capacity may be added. Information box may be presented when IP address utilization in a subnet meets or exceeds a threshold, for example the same threshold that governs inclusion of a subnet in the listing of subnets reaching limits 415 discussed above with reference to FIG. 4.

In this way, a user tasked with managing IP address assignments in one or more subdivisions of a tenancy (sometimes referred to as an integrator) has complete real-time visibility of IP address availability and utilization information for the entire tenancy, at varying levels of granularity—compartment level, VCN level, and subnet level. While it is immaterial which specific IP address numbers are available for individual assignment to a VM (because the cloud network automatically assigns them when provisioning a virtual machine), the user needs to know the quantity of IP addresses that are available when adding VMs to a subnet, or when new subnets and VCNs. The tool for cloud infrastructure resource information scanning described herein makes that information immediately and accurately available to the user.

For example, the user can see using the tool that five addresses are available in a subnet, and knows that he may assign up to five more VMs in that subnet. Or, for example, if there are no additional IP addresses in a subnet, then the user can consult the tool at the VCN level and determine if there are sufficient additional IP addresses available, and create a new subnet with those IP addresses assigned as its CIDR block. Or, for example, if there are no additional IP addresses in a VCN, then the user can consult the tool at the compartment level and determine if there are sufficient additional IP addresses available to create a new VCN. If so, the user can then create an additional VCN and a new subnet within it with sufficient IP addresses for assignment assigned to a requested number of new VMs. The tool can even automate the process of selecting the CIDR block for new subnets and new VCNs.

In one embodiment, where the graphical user interface shows a subnet-level detail page showing details of a subnet subdivision of the tenancy such as subnet-level detail page 700, method 300 may be extended to create the subnet-level detail page. The processor may further determine (i) a used proportion of an IP address range assigned to the subnet that has been assigned to specific virtual compute resources within the subnet for use (such as is indicated by 'used' key 735 in graphical representation 730), and (ii) a free proportion of the IP address range assigned to the subnet that has not been assigned to virtual compute resources (such as is indicated by 'free' key 735 in graphical representation 730). This information drives the presentation of graphical representation 730. The processor may generate a graphical representation of the subnet that visually indicates the used proportion and the free proportion of the IP address range assigned to the subnet (such as graphical representation 730). The processor may filter a listing of virtual compute resources included in the tenancy to include in the listing only those virtual compute resources included in the subnet, such as is shown and described with reference to listing of resource utilization 725. The processor may then include the graphical representation of the subnet and the filtered listing of virtual compute resources in the tenancy in the subnet-level detail page, as can be seen in subnet-level detail page 700.

—Example Steps for Configuring the System—

In one embodiment, conceptually, the system for cloud infrastructure resource information scanning is divided into two parts—a front-end and a back-end. The front-end is a user interface for presenting and interacting with a dashboard view. The back-end is a data service for retrieving and generating information that drives the dashboard view on the front-end.

In one embodiment, the front-end includes the user-interface 230 and user interface pod 235 as shown and described herein with reference to FIG. 2 and elsewhere herein, and which generates the GUIs shown and described with reference to FIGS. 4-7. In one embodiment, the front-end is developed using React JS v16.13.1. In one embodiment, the front-end may be set up and edited using the following steps.

Step 1: Clone the front-end project. In one embodiment, the front-end project can be cloned using either a "git clone" command to create a copy of a repository containing the front-end project into a new directory in a tenant's tenancy, or by downloading a compressed archive file (such as a zip .zip file or tar .tgz file) containing the front-end project and expanding the front-endproject into a new directory in the tenant's tenancy. In one embodiment, the new directory folder may have the label 'project-iris-ui'.

Step 2: Enter the new directory. For example, from the terminal, go into the new directory, for example, into the 'project-iris-ui' folder.

Step 3: Run the command 'npm install' to install the front-end package (including any packages that the front-end package depends on).

Step 4: Run the command 'npm start' to starts the development server. The user can view the GUI dashboard pages. If necessary, the user can open the code of the front-end package in any code editor, make changes, and upon saving, the GUI dashboard pages may be (re)loaded refreshed with the changes implemented.

In one embodiment, the front-end package (including any configuration changes made on the development server) may be put into production using the following steps:

Step 1: Build the docker image by executing the command 'docker build'. The user should make note of the image identifier that is displayed at the conclusion of a successful docker image build: Successfully built <image-id>.

Step 2: Tag the docker image in a cloud infrastructure registry of a cloud network computing system to provide a unique build identifier for the docker image of the front-end, for example by executing the command 'docker tag <image-id> phx.ocir.io/spectra/project-iris/ui:<version-number>'.

Step 3: Push the image into the cloud infrastructure registry, for example by executing the command 'docker push phx.ocirio/spectra/project-iris/ui:<version-number>'.

Step 4: Open a deployment configuration file, for example, open the 'deployment_iris_ui.yaml' file, and make sure to refer to the correct image, ports, etc.

Step 5: Set up a proxy, for example by executing the command 'export https_proxy=www-proxy-hqdc.us.oracle.com:80'.

Step 6: Update a container engine cluster (such as a kubernetes cluster) to match local state using the deployment configuration file, for example by executing the command 'kubectl apply -f deployment_iris_ui.yaml -n iris'.

Step 7: Wait briefly to allow changes to take effect before accessing the cloud infrastructure resource information scanning tool 120. For example, wait for 10-15 seconds for the new user interface pod to be in running state. Upon reloading the front-end URL, changes in production will be visible in the displayed dashboard GUIs.

In one embodiment, the back-end includes scanner microservice 240 and scanner microservice pod 245 as shown and described with reference to FIG. 2 and elsewhere herein, and which retrieves and derives or generates data for display and use by the GUIs shown and described with reference to FIGS. 4-7. In one embodiment, the back-end is a Helidon microservice. In one embodiment, the back-end may be set up and edited using the following steps.

Step 1: Clone the back-end project. In one embodiment, the back-end project can be cloned using either a "git clone" command to create a copy of a repository containing the back-end project into a new directory in a tenant's tenancy, or by downloading a compressed archive file (such as a zip .zip file or tar .tgz file) containing the back-end project and expanding the back-end project into a new directory in the tenant's tenancy. In one embodiment, the new directory folder may have the label 'project-iris'.

Step 2: Enter the new directory. For example, from the terminal, go into the new directory, for example, into the 'project-iris' folder.

Step 3: Build the docker image by executing the command 'docker build'. The user should make note of the image identifier that is displayed at the conclusion of a successful docker image build: Successfully built <image-id>.

Step 4: Tag the image in a cloud infrastructure registry of a cloud network computing system to provide a unique build identifier for the docker image of the back-end, for example by executing the command 'docker tag <image-id> phx.ocir.io/spectra/project-iris:<version-number>'.

Step 5: Push the image the cloud infrastructure registry, for example by executing the command 'docker push phx.ocir.io/spectra/project-iris:<version-number>'.

Step 6: Complete the Terraform variables and appropriate context values of deployment (defined in the deployment configuration file) needed for the access to the tenancy and cluster respectively for deployment_iris.yaml file to execute successfully.

Step 7: Declaratively create or update a back-end object (for example a pod such as scanner microservice pod 245) in a container engine cluster (such as a kubernetes cluster), for example by running 'kubectl apply -f deployment_iris.yaml -n iris'.

Step 8: Fetch data for presentation by the front-end dashboards from the back-end object. For example, accessing http://<IP address>/iris/getIrisData/fetch returns the JSON value(s) (of strings, numbers, objects, arrays, Booleans, or NULLs) for all requested data. In one embodiment, the IP address for this fetch is an IP address for the declaratively created back-end object. In one embodiment, the fetched data is returned as a single JSON object that can be passed back to the front-end, parsed, and presented in the front-end dashboard GUIs. In one embodiment, the fetched data is returned as multiple JSON objects, for example, for each subnet in the tenancy, an object describing the subnet by compartment, VCN, subnet name, assigned IP name, and IP address of the subnet; for each compartment, each VCN, and subnet, an object showing the IP addresses utilized, reserved, and unavailable; or other objects.

—Software Module Embodiments—

In general, software instructions are designed to be executed by one or more suitably programmed processor accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, the present system (such as cloud network computing system 105) is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

—Computing Device Embodiments—

Figure 8:
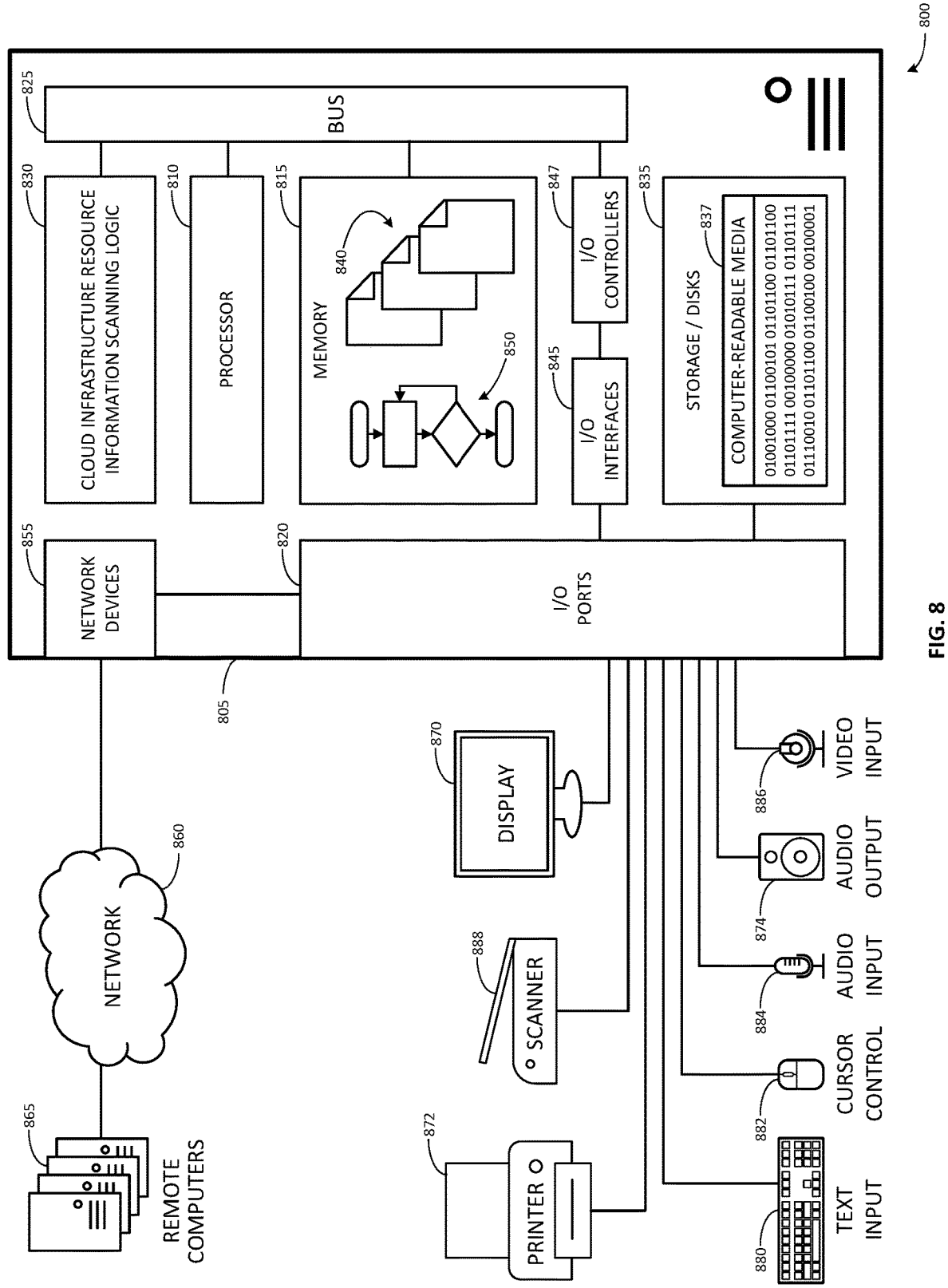
FIG. 8 illustrates one embodiment of a computing system configured with the example systems and/or methods disclosed.

FIG. 8 illustrates an example computing system 800 that is configured and/or programmed as a special purpose computing device with one or more of the example systems and methods described herein, and/or equivalents. The example computing device may be a computer 805 that includes a processor 810, a memory 815, and input/output ports 820 operably connected by a bus 825. In one example, the computer 805 may include dynamic custom columns inclusion logic 830 configured to facilitate dynamic inclusion of custom columns into a logical model similar to the logic, systems, and methods shown and described with reference to FIGS. 1-7. In different examples, the dynamic custom columns inclusion logic 830 may be implemented in hardware, a non-transitory computer-readable medium with stored instructions, firmware, and/or combinations thereof. While the dynamic custom columns inclusion logic 830 is illustrated as a hardware component attached to the bus 825, it is to be appreciated that in other embodiments, the dynamic custom columns inclusion logic 830 could be implemented in the processor 810, stored in memory 815, or stored in disk 835 on computer-readable media 837.

In one embodiment, dynamic custom columns inclusion logic 830 or the computing system 800 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform dynamic inclusion of custom columns into a logical model. The means may also be implemented as stored computer executable instructions that are presented to computer 805 as data 840 that are temporarily stored in memory 815 and then executed by processor 810.

Dynamic custom columns inclusion logic 830 may also provide means (e.g., hardware, non-transitory computer-readable medium that stores executable instructions, firmware) for performing dynamic inclusion of custom columns into a logical model.

Generally describing an example configuration of the computer 805, the processor 810 may be a variety of various processors including dual microprocessor and other multi-processor architectures. A memory 81015 may include volatile memory and/or non-volatile memory. Non-volatile memory may include, for example, ROM, PROM, EPROM, EEPROM, and so on. Volatile memory may include, for example, RAM, SRAM, DRAM, and so on. A storage disk 835 may be operably connected to the computer 805 by way of, for example, an input/output (I/O) interface (for example, a card or device) 845 and an input/output port 820 that are controlled by at least an input/output (I/O) controller 847.

The disk 835 may be, for example, a magnetic disk drive, a solid-state disk drive, a floppy disk drive, a tape drive, a Zip drive, a flash memory card, a memory stick, and so on. Furthermore, the disk 835 may be a CD-ROM drive, a CD-R drive, a CD-RW drive, a DVD ROM, and so on. The memory 815 can store a process 850 and/or data 840 formatted as one or more data structures, for example. The disk 835 and/or the memory 815 can store an operating system that controls and allocates resources of the computer 805. The computer 805 may interact with, control, and/or be controlled by input/output (I/O) devices via the input/output (I/O) controller 847, the I/O interfaces 845 and the input/output ports 820. The input/output devices include one or more displays 870, printers 872 (such as inkjet, laser, or 3D printers), and audio output devices 874 (such as speakers or headphones), text input devices 880 (such as keyboards), a pointing and selection device 882 (such as mice, trackballs, touchpads, touch screens, joysticks, pointing sticks, stylus mice), audio input devices 884 (such as microphones), video input devices 886 (such as video and still cameras), video cards (not shown), disk 835, network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a LAN, a WAN, and other networks.

—Selected Advantages—

The console of cloud network computing systems that do not implement the systems and methods for cloud infrastructure resource information scanning described herein do not provide a direct solution for real-time presentation of IP address utilization information, with the infrastructure details are categorized by subnet(s) and by VCN. If the users want to understand the IP address consumption status of a particular tenancy in a cloud network computing system that has not been improved as described herein, they have to individually explore the different compute instances and VCNs in that particular tenancy to discover the available IP address resources that can be used in the existing infrastructure. This is time-consuming and error prone.

The systems and methods for cloud infrastructure resource information scanning described herein enable a real-time, absolutely accurate "dashboard" style view of IP address utilization information for a tenancy. In one embodiment, the dashboard provides a one-stop solution by displaying current IP address consumption details in a single page for each of several levels of granularity in the tenancy—categorized by subnet(s), VCN(s), compartment(s), or for the entire tenancy—which eliminates the time wasted by the users to explore every resource separately. Further, this real-time, live availability of the information is extended to displaying the available CIDR range of a given VCN for the users to create subnets as well as to both automatically suggesting an available CIDR range based on an input subnet size and automatically initiating creation of the subnet in the suggested CIDR range. This eliminates the time-consuming and tedious process of calculation of a CIDR range and the error-prone and wasteful process of random CIDR range assignment.

Compared with cloud infrastructure systems that do not implement the systems and methods for cloud infrastructure resource information scanning described herein, the cloud infrastructure resource information scanning systems and methods make it easy for a user to visually review the resource utilization details with respect to subnets of a particular VCN, a feature which is not present (in the console or elsewhere) in cloud infrastructure systems that are not improved as described herein. In particular, absent the systems and methods described herein for cloud infrastructure resource information scanning, a user authorized to access a first compartment 126 but not authorized to access other compartments 126 will not be able to access information about the IP address usage of the other compartments, even though all compartments are assigning IP addresses to VCNs 127 from the same tenancy 125 and affect IP address availability for all compartments 126. Solving this problem, in one embodiment, the systems and methods described herein for cloud infrastructure resource information scanning provides visibility to IP address usage across all compartments 126 of the tenancy 125 in order to enable the users associated with one compartment 126 to configure their VCNs 127 using CIDR blocks in the tenancy 125 that are not in use in other compartments 126 that the users do not have access to.

As one advantage, the IP address utilization information presented by the cloud infrastructure resource information scanning systems and methods described herein prevents a user from making failed random attempts to create loadbalancers or nodepools without knowing the available resources underneath. In particular, when a user or developer tries to create a subnet 128 in a VCN 127 which is already reaching its limits, a console of the cloud network computing system 105 (for example, the OCI console) prevents the creation and informs the user that there is not enough space to create the subnet 128. The CIDR block of the VCN 127 and the range of IP addresses in the CIDR block are not immediately available to the user or developer. Without the systems and methods for cloud infrastructure resource information scanning described herein, a cloud network computing system does not provide a way to directly retrieve these IP resource details and present them on a single page, nor does a cloud network computing system provide a way to categorize the IP resource details by compartment 126, VCN 127, or subnet 128.

As one advantage, the cloud infrastructure resource information scanning systems and methods described herein enable the cloud infrastructure system to automatically provide the available CIDR for creating a subnet under a VCN. This suggestive option feature is not present in cloud infrastructure systems that are not improved as described herein. Without the systems and methods for cloud infrastructure resource information scanning described herein, a cloud network computing system cannot automatically supply a CIDR block that will be accepted and allow successful creation of a subnet 128 in the VCN 127.

As a further advantage, the cloud infrastructure resource information scanning systems and methods described herein eliminate any need to individually calculate free IP addresses by traversing to each subnet.

Advantageously, the systems and methods for cloud infrastructure resource information scanning described herein are configured as a microservice for delivering IP address utilization information that can be monitored and scaled independently of client applications.

While the systems and methods are described herein with reference to improving OCI, cloud network computing systems other than OCI may be improved by implementing the systems and methods for cloud infrastructure resource information scanning described herein, with those technological modifications necessary in order to adhere to the infrastructure of the other cloud network computing systems.

Where a tenancy is divided (for example among several development teams of users) into separate compartments, access to each compartment (and information about its VCNs and subnets) is limited to users associated with and authorized to access that compartment. Users not associated with the compartment are not able to access that compartment. Absent the systems and methods described herein for cloud infrastructure resource information scanning, a user authorized to access a first compartment, but not authorized to access a second compartment will not be able to access information about the IP address usage of the second compartment, even though both compartments are assigning IP addresses to VCNs from the same tenancy, and affect IP address availability for both compartments. Solving this problem, in one embodiment, the systems and methods described herein for cloud infrastructure resource information scanning provides visibility to IP address usage across all compartments of the tenancy. Users associated with one compartment are thus enabled to configure their VCNs using CIDR blocks in the tenancy without concern that the IP addresses are in use in other compartments that the users do not have access to.

These and other advantages are made possible to cloud computing systems by the systems and methods described herein, and were not previously possible to cloud computing systems not configured to execute the systems and methods described herein.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The following abbreviations when used herein refer to the associated term adjacent to the abbreviation:

AD: availability domain.
API: application programming interface.
ASIC: application specific integrated circuit.
CD: compact disk.
CD-R: CD recordable.
CD-RW: CD rewriteable.
CIDR: classless inter-domain routing.
DHCP: dynamic host configuration protocol.
DRAM: dynamic RAM.
DVD: digital versatile disk and/or digital video disk.
EPROM: erasable PROM.
EEPROM: electrically erasable PROM.
HPC: high-performance computing.
GPU: graphics processing unit.
GUI: graphical user interface.
HTTP: hypertext transfer protocol.
I/O: input/output.
IAAS: infrastructure as a service.
IAC: infrastructure as code.
IP: internet protocol.
IPv4: internet protocol version 4.
IPv6: internet protocol version 6.
JSON: JavaScript object notation.
LAN: local area network.
LPG: local peering gateways.
NAS: network attached storage.
NAT: network address translation.
OCI: Oracle Cloud Infrastructure or Oracle Generation 2 Cloud Infrastructure.
OCIR: Oracle cloud infrastructure registry.
OKE: Oracle container engine for Kubernetes or Oracle Kubernetes engine.
PAAS: platform as a service.
PCI: peripheral component interconnect.
PCIE: PCI express.
PROM: programmable ROM.
RAM: random access memory.
REST: representational state transfer.
ROM: read only memory.
RPC: remote peering connection.
SAAS: software as a service.
SOAP: simple object access protocol.
SQL: structured query language.
SRAM: synchronous RAM.
TCP: transmission control protocol.
URL: uniform resource locator.
USB: universal serial bus.
VCN: virtual cloud network.
VM: virtual machine.
VNIC: virtual network interface card.
VPN: virtual private network.
WAN: wide area network.
XML: extensible markup language.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer implemented method, comprising:
    scanning a cloud network computing system tenancy to, for each subdivision of a set of subdivisions of the tenancy,
        (i) identify an IP address range assigned to the subdivision, and
        (ii) identify any immediate parent subdivision to which the subdivision belongs;
    for each subdivision in the set of subdivisions, determining a proportion of the IP address range assigned to the subdivision that is free in the subdivision based on the identified IP address ranges and the identified parent subdivisions for the subdivision;
    generating a graphical user interface showing the proportion of the IP address range that is free for one or more of the set of subdivisions;
    transmitting the graphical user interface for display on a computing device associated with a user;
    showing, in the graphical user interface, selectable lists including a compartment list, a virtual cloud network list, and subnet list within the tenancy; and
    in response to a user selection of:
        (i) a compartment from the compartment list, generating the graphical user interface to display a compartment-level detail page, wherein the compartment-level detail page shows IP addresses utilized and IP addresses available for each virtual cloud network across the selected compartment,
        (ii) a virtual cloud network from the virtual cloud network list, generating the graphical user interface to display a virtual-cloud-network-level detail page, wherein the virtual-cloud-network-level detail page shows IP addresses utilized and IP addresses available across the selected virtual cloud network by one or more subnets within the selected virtual cloud network; and
        (iii) a subnet from the subnet list, generating the graphical user interface to display a subnet-level detail page, wherein the subnet-level detail page shows IP addresses utilized and IP addresses available within the selected subnet.

2. The computer-implemented method of claim 1, wherein:
    the subdivisions of the tenancy include compartments, virtual cloud networks, subnets, and virtual compute resources;
    the compartments are a parent subdivision including one or more virtual cloud networks, the virtual cloud networks are a parent subdivision to one or more subnets, and the subnets are a parent subdivision to one or more virtual compute resources; and
    an IP address range assigned to a virtual compute resource of the one or more virtual compute resources is a single IP address specific to the virtual compute resource.

3. The computer-implemented method of claim 1, wherein the computer-implemented method is performed in real-time.

4. The computer-implemented method of claim 1, wherein the graphical user interface shows a tenancy-level detail page and the set of subdivisions includes a set of one or more subnets, the computer-implemented method further comprising:
    generating a listing of subnets within the tenancy that have assigned a number of IP addresses from an IP address range of a subnet to virtual compute resources that meets or exceeds a threshold that indicates that the subnet is approaching a limit of assignable IP addresses;
    generating a listing of all virtual compute resources included in the tenancy; and
    including the listing of subnets and the listing of all virtual compute resources in the tenancy in the tenancy-level detail page.

5. The computer-implemented method of claim 1 wherein the graphical user interface shows the compartment-level detail page showing details of a compartment subdivision of the tenancy, the computer-implemented method further comprising:
    generating a listing of virtual cloud networks within the compartment; for each virtual cloud network,
    determining
        (i) a reserved proportion of an IP address range assigned to the virtual cloud network that is reserved for use by a cloud networking service,
        (ii) an allocated proportion of the IP address range assigned to the virtual cloud network that is allocated to use by virtual compute resources, and
        (iii) an unallocated proportion of the IP address range assigned to the virtual cloud network that is unallocated and remains available for allocation to virtual compute resources;

generating a graphical representation of the listing of virtual cloud networks within the compartment subdivision that visually indicates, for each virtual cloud network, the reserved proportion, the allocated proportion, and the unallocated proportion of the IP address range assigned to the virtual cloud network;

filtering a listing of virtual compute resources included in the tenancy to include in the listing of virtual compute resources only those virtual compute resources included in the compartment subdivision; and including the graphical representation of the listing of virtual cloud networks and the filtered listing of virtual compute resources in the tenancy in the compartment-level detail page.

6. The computer-implemented method of claim 1 wherein the graphical user interface shows the virtual-cloud-network-level detail page showing details of a virtual cloud network subdivision of the tenancy, the computer-implemented method further comprising:

generating a listing of subnets within the virtual cloud network subdivision of the tenancy;

for each subnet, determining:
(i) a used proportion of an IP address range assigned to the subnet that has been assigned to specific virtual compute resources within the subnet for use, and
(ii) a free proportion of the IP address range assigned to the subnet that has not been assigned to virtual compute resources;

generating a graphical representation of the listing of subnets within the virtual cloud network subdivision that visually indicates, for each subnet, the used proportion and the free proportion of the IP address range assigned to the subnet;

filtering a listing of virtual compute resources included in the tenancy to include in the listing of virtual compute resources only those virtual compute resources included in the virtual cloud network subdivision; and including the graphical representation of the listing of subnets and the filtered listing of virtual compute resources in the tenancy in the virtual-cloud-network-level detail page.

7. The computer-implemented method of claim 1 wherein the graphical user interface shows a view of IP address ranges allocated to subnets within an IP address range of a virtual cloud network subdivision of the tenancy, the computer-implemented method further comprising:

generating a listing of subnets within the virtual cloud network subdivision;

for each subnet in the listing, identifying a beginning IP address and an end IP address of the IP address range allocated to the subnet;

generating a graphical representation of an IP address range of the virtual cloud network subdivision assigned to subnets within the IP address range of the virtual cloud network subdivision that visually indicates IP addresses between the beginning IP address and end IP address, inclusive, of each subnet in the listing to be allocated, and visually indicates other IP addresses to be unallocated; and including the graphical representation of the IP address range of the virtual cloud network subdivision assigned to subnets within the IP address range of the virtual cloud network subdivision in one or more pages of the graphical user interface.

8. The computer-implemented method of claim 1 wherein the graphical user interface presents an interface for suggesting an IP address range for a new subnet within a virtual cloud network subdivision of the tenancy, the computer-implemented method further comprising:

generating a listing of subnets within the virtual cloud network subdivision;

for each subnet in the listing, identifying a beginning IP address and an end IP address of an IP address range allocated to the subnet;

identifying a set of unallocated IP address ranges within an IP address range of the virtual cloud network subdivision that do not overlap with IP address ranges allocated to subnets;

for each unallocated IP address range in the set, determining number of IP addresses within the IP address range of the virtual cloud network subdivision;

accepting a user size input that indicates a desired size for a new subnet within the virtual cloud network subdivision;

in response to the user size input, identifying a set of suitable ranges that are of sufficient size to accommodate the new subnet of the desired size within the unallocated IP address ranges;

accepting a user selection input that selects one of the suitable ranges; and in response to the user selection input, launching a console dialogue to create the new subnet within the virtual cloud network subdivision with IP address range values in the console dialogue automatically pre-populated with the selected suitable range.

9. The computer-implemented method of claim 1 wherein the graphical user interface shows the subnet-level detail page showing details of a subnet subdivision of the tenancy, further comprising:

determining (i) a used proportion of an IP address range assigned to the subnet subdivision that has been assigned to specific virtual compute resources within the subnet subdivision for use, and (ii) a free proportion of the IP address range assigned to the subnet subdivision that has not been assigned to virtual compute resources;

generating a graphical representation of the subnet subdivision that visually indicates the used proportion and the free proportion of the IP address range assigned to the subnet subdivision;

filtering a listing of virtual compute resources included in the tenancy to include in the listing of virtual compute resources only those virtual compute resources included in the subnet subdivision; and including the graphical representation of the subnet and the filtered listing of virtual compute resources in the tenancy in the subnet-level detail page.

10. A non-transitory computer-readable medium storing computer-executable instructions that, when executed by at least a processor of a computer, cause the computer to:

scan a cloud network computing system tenancy to, for each subdivision of a set of subdivisions of the tenancy, (i) identify an IP address range assigned to the subdivision, and (ii) identify any immediate parent subdivision to which the subdivision belongs;

for each subdivision in the set of subdivisions, determine a proportion of the IP address range assigned to the subdivision that is free in the subdivision based on the identified IP address ranges and the identified parent subdivisions for the subdivision;

generate a graphical user interface showing the proportion of the IP address range that is free for one or more of the set of subdivisions;

transmit the graphical user interface for display on a computing device associated with a user;
show, in the graphical user interface, selectable lists including a compartment list, a virtual cloud network list, and subnet list within the tenancy; and
in response to a user selection of:
(i) a compartment from the compartment list, generate the graphical user interface to display a compartment-level detail page, wherein the compartment-level detail page shows IP addresses utilized and IP addresses available for each virtual cloud network across the selected compartment,
(ii) a virtual cloud network from the virtual cloud network list, generate the graphical user interface to display a virtual-cloud-network-level detail page, wherein the virtual-cloud-network-level detail page shows IP addresses utilized and IP addresses available across the selected virtual cloud network by one or more subnets within the selected virtual cloud network; and
(iii) a subnet from the subnet list, generate the graphical user interface to display a subnet-level detail page, wherein the subnet-level detail page shows IP addresses utilized and IP addresses available within the selected subnet.

11. The non-transitory computer readable medium of claim 10, wherein:
the subdivisions of the tenancy include compartments, virtual cloud networks, subnets, and virtual compute resources;
the compartments are a parent subdivision including one or more virtual cloud networks, the virtual cloud networks are a parent subdivision to one or more subnets, and the subnets are a parent subdivision to one or more virtual compute resources; and
an IP address range assigned to a virtual compute resource of the one or more virtual compute resources is a single IP address specific to the virtual compute resource.

12. The non-transitory computer readable medium of claim 10, wherein the instructions are executed in real-time.

13. The non-transitory computer readable medium of claim 10, wherein the graphical user interface shows a tenancy-level detail page and the set of subdivisions includes a set of one or more subnets, and wherein the instructions further cause the computer to:
generate a listing of subnets within the tenancy that have assigned a number of IP addresses from an IP address range of a subnet to virtual compute resources that meets or exceeds a threshold that indicates that the subnet is approaching a limit of assignable IP addresses; generate a listing of all virtual compute resources included in the tenancy; and
include the listing of subnets and the listing of all virtual compute resources in the tenancy in the tenancy-level detail page.

14. The non-transitory computer readable medium of claim 10,
wherein the graphical user interface shows the compartment-level detail page showing details of a compartment subdivision of the tenancy, and
wherein the instructions further cause the computer to:
generate a listing of virtual cloud networks within the compartment subdivision;
for each virtual cloud network, determining (i) a reserved proportion of an IP address range assigned to the virtual cloud network that is reserved for use by a cloud networking service, (ii) an allocated proportion of the IP address range assigned to the virtual cloud network that is allocated to use by virtual compute resources, and (iii) an unallocated proportion of the IP address range assigned to the virtual cloud network that is unallocated and remains available for allocation to virtual compute resources;
generate a graphical representation of the listing of virtual cloud networks within the compartment subdivision that visually indicates,
for each virtual cloud network, the reserved proportion, the allocated proportion, and the unallocated proportion of the IP address range assigned to the virtual cloud network;
filter a listing of virtual compute resources included in the tenancy to include in the listing of virtual compute resources only those virtual compute resources included in the compartment subdivision; and
include the graphical representation of the listing of virtual cloud networks and the filtered listing of virtual compute resources in the tenancy in the compartment-level detail page.

15. The non-transitory computer readable medium of claim 10,
wherein the graphical user interface shows the virtual-cloud-network-level detail page showing details of a virtual cloud network subdivision of the tenancy, and
wherein the instructions further cause the computer to:
generate a listing of subnets within the virtual cloud network subdivision;
for each subnet, determine (i) a used proportion of an IP address range assigned to the subnet that has been assigned to specific virtual compute resources within the subnet for use, and (ii) a free proportion of the IP address range assigned to the subnet that has not been assigned to virtual compute resources;
generate a graphical representation of the listing of subnets within the virtual cloud network subdivision that visually indicates, for each subnet, the used proportion and the free proportion of the IP address range assigned to the subnet;
filter a listing of virtual compute resources included in the tenancy to include in the listing of virtual compute resources only those virtual compute resources included in the virtual cloud network subdivision; and
include the graphical representation of the listing of subnets and the filtered listing of virtual compute resources in the tenancy in the virtual-cloud-network-level detail page.

16. The non-transitory computer readable medium of claim 10, wherein the graphical user interface presents an interface for suggesting an IP address range for a new subnet within a virtual cloud network subdivision of the tenancy, and wherein the instructions further cause the computer to:
generate a listing of subnets within the virtual cloud network subdivision;
for each subnet in the listing, identify a beginning IP address and an end IP address of an IP address range allocated to the subnet;
identify a set of unallocated IP address ranges within the IP address range of the virtual cloud network subdivision that do not overlap with the IP address ranges allocated to subnets; for each unallocated IP address range in the set, determine number of IP addresses within the IP address range of the virtual cloud network subdivision;
accept a user size input that indicates a desired size for a new subnet within the virtual cloud network;

in response to the user size input, identify a set of suitable ranges that are of sufficient size to accommodate the new subnet of the desired size within the unallocated IP address ranges; accept a user selection input that selects one of the suitable ranges; and in response to the user selection input, launch a console dialogue to create the new subnet within the virtual cloud network subdivision with IP address range values in the console dialogue automatically pre-populated with the selected suitable range.

17. The non-transitory computer readable medium of claim 10,
wherein the graphical user interface shows the subnet-level detail page showing details of a subnet subdivision of the tenancy, and
wherein the instructions further cause the computer to:
determine (i) a used proportion of an IP address range assigned to the subnet subdivision that has been assigned to specific virtual compute resources within the subnet subdivision for use, and (ii) a free proportion of the IP address range assigned to the subnet that has not been assigned to virtual compute resources;
generate a graphical representation of the subnet subdivision that visually indicates the used proportion and the free proportion of the IP address range assigned to the subnet subdivision;
filter a listing of virtual compute resources included in the tenancy to include in the listing of virtual compute resources only those virtual compute resources included in the subnet subdivision; and
include the graphical representation of the subnet subdivision and the filtered listing of virtual compute resources in the tenancy in the subnet-level detail page.

18. A cloud network computing system comprising:
a processor;
a memory operably connected to the processor;
a non-transitory computer-readable medium operably connected to the processor and memory and storing computer-executable instructions that when executed by at least the processor cause the computing system to:
scan a cloud network computing system tenancy to,
for each subdivision of a set of subdivisions of the tenancy,
(i) identify an IP address range assigned to the subdivision, and
(ii) identify any immediate parent subdivision to which the subdivision belongs;
for each subdivision in the set of subdivisions, determine a proportion of the IP address range assigned to the subdivision that is free in the subdivision based on the identified IP address ranges and the identified parent subdivisions for the subdivision;
generate a graphical user interface showing the proportion of the IP address range that is free for one or more of the set of subdivisions;
transmit the graphical user interface for display on a computing device associated with a user;
show, in the graphical user interface, selectable lists including a compartment list, a virtual cloud network list, and subnet list within the tenancy; and
in response to a user selection of:
(i) a compartment from the compartment list, generating the graphical user interface to display a compartment-level detail page, wherein the compartment-level detail page shows IP addresses utilized and IP addresses available for each virtual cloud network across the selected compartment,
(ii) a virtual cloud network from the virtual cloud network list, generate the graphical user interface to display a virtual-cloud-network-level detail page, wherein the virtual-cloud-network-level detail page shows IP addresses utilized and IP addresses available across the selected virtual cloud network by one or more subnets within the selected virtual cloud network; and
(iii) a subnet from the subnet list, generate the graphical user interface to display a subnet-level detail page, wherein the subnet-level detail page shows IP addresses utilized and IP addresses available within the selected subnet.

19. The cloud network computing system of claim 18, wherein:
the subdivisions of the tenancy include compartments, virtual cloud networks, subnets, and virtual compute resources;
the compartments are a parent subdivision including one or more virtual cloud networks, the virtual cloud networks are a parent subdivision to one or more subnets, and
the subnets are a parent subdivision to one or more virtual compute resources; and
the IP address range assigned to a virtual compute resource is a single IP address specific to the virtual compute resource.

20. The cloud network computing system of claim 18,
wherein the graphical user interface presents an interface for suggesting an IP address range for a new subnet within a virtual cloud network subdivision of the tenancy, and
wherein the non-transitory computer-readable medium further comprises instructions that when executed by at least the processor cause the computing system to:
generate a listing of subnets within the virtual cloud network subdivision;
for each subnet in the listing, identify a beginning IP address and an end IP address of an IP address range allocated to the subnet;
identify a set of unallocated IP address ranges within the IP address range of the virtual cloud network subdivision that do not overlap with the IP address ranges allocated to subnets;
for each unallocated IP address range in the set, determine a number of IP addresses within the IP address range of the virtual cloud network subdivision;
accept a user size input that indicates a desired size for a new subnet within the virtual cloud network subdivision;
in response to the user size input, identify a set of suitable ranges that are of sufficient size to accommodate the new subnet of the desired size within the unallocated IP address ranges;
accept a user selection input that selects one of the suitable ranges; and in response to the user selection input, launch a console dialogue to create the new subnet within the virtual cloud network subdivision with IP address range values in the console dialogue automatically pre-populated with the selected suitable range.

* * * * *

UNITED STATES PATENT AND TRADEMARK OFFICE
CERTIFICATE OF CORRECTION

PATENT NO. : 11,470,040 B2
APPLICATION NO. : 17/117322
DATED : October 11, 2022
INVENTOR(S) : Snehashis et al.

It is certified that error appears in the above-identified patent and that said Letters Patent is hereby corrected as shown below:

On the Title Page

On page 2, Column 1, item (56) under Other Publications, Line 8, delete "Kubemetes;" and insert -- Kubernetes; --, therefor.

On page 2, Column 1, item (56) under Other Publications, Line 14, delete "VOverview" and insert -- Overview --, therefor.

In the Specification

In Column 5, Line 43, delete "of the of" and insert -- of the --, therefor.

In Column 14, Line 26, delete "that that" and insert -- that --, therefor.

In Column 18, Line 18, delete "is are" and insert -- is --, therefor.

In Column 18, Line 66, delete "Ib1'" and insert -- lb1' --, therefor.

In Column 21, Line 2, delete "And" and insert -- and --, therefor.

In Column 23, Line 8, delete "block))" and insert -- block) --, therefor.

In Column 25, Line 43, delete "block." and insert -- block) --, therefor.

In Column 29, Line 34, delete "ocirio" and insert -- ocir.io --, therefor.

In Column 34, Line 46, delete "delete "on)." and insert -- on. --, therefor.

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,470,040 B2

In the Claims

In Column 37, Line 44, in Claim 1, delete "computer implemented" and insert -- computer-implemented --, therefor.

In Column 41, Line 26, in Claim 11, delete "computer readable" and insert -- computer-readable --, therefor.

In Column 41, Line 39, in Claim 12, delete "computer readable" and insert -- computer-readable --, therefor.

In Column 41, Line 41, in Claim 13, delete "computer readable" and insert -- computer-readable --, therefor.

In Column 41, Line 56, in Claim 14, delete "computer readable" and insert -- computer-readable --, therefor.

In Column 42, Line 22, in Claim 15, delete "computer readable" and insert -- computer-readable --, therefor.

In Column 42, Line 49, in Claim 16, delete "computer readable" and insert -- computer-readable --, therefor.

In Column 43, Line 11, in Claim 17, delete "computer readable" and insert -- computer-readable --, therefor.